US011087542B2

(12) United States Patent
Bhiravabhatla et al.

(10) Patent No.: US 11,087,542 B2
(45) Date of Patent: Aug. 10, 2021

(54) REPLICATING PRIMITIVES ACROSS MULTIPLE VIEWPORTS

(71) Applicant: Intel Corporation, Santa Clara, CA (US)

(72) Inventors: Kalyan K. Bhiravabhatla, Bangalore (IN); Subramaniam Maiyuran, Gold River, CA (US); Robert M. Toth, Lund (SE); Tomasz Janczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/286,016

(22) Filed: Feb. 26, 2019

(65) Prior Publication Data

US 2019/0259209 A1 Aug. 22, 2019

Related U.S. Application Data

(63) Continuation of application No. 15/394,027, filed on Dec. 29, 2016, now Pat. No. 10,235,811.

(51) Int. Cl.
*G06T 19/00* (2011.01)
*G06T 7/60* (2017.01)
*G06T 15/80* (2011.01)
*G06T 17/10* (2006.01)
*G06T 15/20* (2011.01)
*G06T 15/00* (2011.01)
*G06T 15/40* (2011.01)

(52) U.S. Cl.
CPC .............. *G06T 19/006* (2013.01); *G06T 7/60* (2013.01); *G06T 15/005* (2013.01); *G06T 15/20* (2013.01); *G06T 15/40* (2013.01); *G06T 15/80* (2013.01); *G06T 17/10* (2013.01); *G06T 2200/04* (2013.01)

(58) Field of Classification Search
CPC ........................................................ G06T 7/60
USPC ........................................................ 345/633
See application file for complete search history.

(56) References Cited

U.S. PATENT DOCUMENTS

| 6,842,180 B1 | 1/2005 | Maiyuran et al. |
| 6,885,378 B1 | 4/2005 | Tsai et al. |
| 7,710,417 B2 | 5/2010 | Ramshaw |
| 8,144,147 B2 | 3/2012 | Munkberg et al. |
| 8,434,074 B2 | 4/2013 | Janczak et al. |
| 8,542,247 B1 | 9/2013 | Hakura et al. |
| 8,564,616 B1 | 10/2013 | Hakura et al. |

(Continued)

FOREIGN PATENT DOCUMENTS

WO 2017/171568 A1 10/2017

OTHER PUBLICATIONS

"Parallel Occlusion Culling on GPUs Cluster", Hua Xiong et al., 2006 ACM.*

(Continued)

*Primary Examiner* — Javid A Amini
(74) *Attorney, Agent, or Firm* — Jordan IP Law, LLC

(57) ABSTRACT

An embodiment of a graphics processor pipeline apparatus may include a vertex fetcher to fetch vertices, a vertex shader communicatively coupled to the vertex fetcher to shade the fetched vertices, a primitive assembler communicatively coupled to the vertex shader to assemble primitives, and a primitive replicator communicatively coupled to the primitive assembler to replicate primitives for at least a first and a second viewport.

24 Claims, 23 Drawing Sheets

(56) References Cited

U.S. PATENT DOCUMENTS

| | | |
|---|---|---|
| 8,566,537 B2 | 10/2013 | Ni et al. |
| 8,587,585 B2 | 11/2013 | Munkberg et al. |
| 8,842,121 B2 | 9/2014 | Akenine-Moeller et al. |
| 9,038,034 B2 | 5/2015 | Akenine-Moeller et al. |
| 9,058,697 B2 | 6/2015 | Akenine-Moeller et al. |
| 9,165,348 B2 | 10/2015 | Toth et al. |
| 9,183,014 B2 | 11/2015 | Chen et al. |
| 9,183,608 B2 | 11/2015 | Akenine-Moller et al. |
| 9,201,487 B2 | 12/2015 | Akenine-Moller et al. |
| 9,262,841 B2 | 2/2016 | Toth et al. |
| 9,390,541 B2 | 7/2016 | Hasselgren et al. |
| 9,401,046 B2 | 7/2016 | Munkberg et al. |
| 9,449,360 B2 | 9/2016 | Janczak et al. |
| 9,465,212 B2 | 10/2016 | Munkberg et al. |
| 9,491,490 B1 | 11/2016 | Toth et al. |
| 9,501,864 B2 | 11/2016 | Akenine-Moller et al. |
| 9,619,918 B2 | 4/2017 | Maxim |
| 9,811,940 B2 | 11/2017 | Hui et al. |
| 2003/0030643 A1 | 2/2003 | Taylor et al. |
| 2004/0085312 A1 | 5/2004 | Buchner et al. |
| 2005/0134588 A1* | 6/2005 | Aila .................. G06T 15/60 |
| | | 345/426 |
| 2005/0195187 A1* | 9/2005 | Seiler .................. G06T 15/405 |
| | | 345/422 |
| 2006/0221076 A1 | 10/2006 | Takahashi et al. |
| 2008/0007559 A1 | 1/2008 | Kalaiah et al. |
| 2008/0094408 A1 | 4/2008 | Yin et al. |
| 2010/0091018 A1 | 4/2010 | Tatarchuk et al. |
| 2010/0302246 A1 | 12/2010 | Jiao et al. |
| 2011/0227920 A1 | 9/2011 | Adams et al. |
| 2012/0081370 A1 | 4/2012 | Min et al. |
| 2013/0113790 A1 | 5/2013 | Kazakov |
| 2013/0169642 A1 | 7/2013 | Frascati et al. |
| 2013/0257885 A1 | 10/2013 | Vaidyanathan et al. |
| 2013/0271465 A1 | 10/2013 | Clarberg et al. |
| 2014/0198113 A1 | 7/2014 | Janczak et al. |
| 2014/0267276 A1 | 9/2014 | Hakura et al. |
| 2014/0267345 A1 | 9/2014 | Toth et al. |
| 2014/0320509 A1 | 10/2014 | Chen et al. |
| 2015/0070355 A1 | 3/2015 | Clarberg et al. |
| 2015/0170345 A1 | 6/2015 | Vaidyanathan et al. |
| 2015/0177823 A1 | 6/2015 | Maiyuran et al. |
| 2015/0178983 A1 | 6/2015 | Akenine-Moeller et al. |
| 2015/0287240 A1 | 10/2015 | Janczak et al. |
| 2015/0309800 A1 | 10/2015 | Chen et al. |
| 2015/0348317 A1* | 12/2015 | Hakura .................. G06T 15/005 |
| | | 345/426 |
| 2015/0379664 A1 | 12/2015 | Bhiravabhatla et al. |
| 2015/0379672 A1 | 12/2015 | Wang |
| 2016/0086299 A1* | 3/2016 | Sharma .................. G06T 15/405 |
| | | 345/422 |
| 2016/0092239 A1 | 3/2016 | Maiyuran et al. |
| 2016/0092240 A1 | 3/2016 | Maiyuran et al. |
| 2016/0093069 A1 | 3/2016 | Maiyuran et al. |
| 2016/0139934 A1 | 5/2016 | Sarangi et al. |
| 2016/0140686 A1 | 5/2016 | Lueh et al. |
| 2016/0140737 A1 | 5/2016 | Hui et al. |
| 2016/0179535 A1 | 6/2016 | Chen et al. |
| 2016/0180585 A1 | 6/2016 | Maiyuran et al. |
| 2016/0189327 A1 | 6/2016 | Maiyuran et al. |
| 2016/0275701 A1 | 9/2016 | Clarberg et al. |
| 2016/0284120 A1 | 9/2016 | Hasselgren et al. |
| 2016/0307297 A1 | 10/2016 | Akenine-Moller et al. |
| 2016/0350112 A1 | 12/2016 | Pal et al. |
| 2016/0350892 A1* | 12/2016 | Zhong .................. H04N 13/275 |
| 2016/0358299 A1 | 12/2016 | Toth et al. |
| 2016/0378432 A1 | 12/2016 | Maiyuran et al. |
| 2017/0010894 A1 | 1/2017 | Nalluri et al. |
| 2017/0032567 A1 | 2/2017 | Park et al. |
| 2017/0069132 A1 | 3/2017 | Howson et al. |
| 2017/0084078 A1 | 3/2017 | Boudier |
| 2017/0091893 A1 | 3/2017 | Bhiravabhatla et al. |
| 2017/0091985 A1 | 3/2017 | Bhiravabhatla et al. |
| 2017/0154403 A1 | 6/2017 | Toth et al. |
| 2017/0177369 A1 | 6/2017 | Guo et al. |
| 2017/0178274 A1 | 6/2017 | Venkatesh et al. |
| 2017/0178370 A1 | 6/2017 | Maiyuran et al. |
| 2017/0178384 A1 | 6/2017 | Venkatesh et al. |
| 2017/0206700 A1 | 7/2017 | Munkberg et al. |
| 2017/0213313 A1 | 7/2017 | Hakura et al. |
| 2017/0372446 A1 | 12/2017 | Ashar et al. |
| 2018/0075573 A1 | 3/2018 | Toth et al. |
| 2018/0081429 A1 | 3/2018 | Akenine-Moller et al. |
| 2018/0082464 A1 | 3/2018 | Akenine-Moller et al. |
| 2018/0082467 A1 | 3/2018 | Andersson et al. |
| 2018/0095785 A1 | 4/2018 | Koker et al. |
| 2018/0096446 A1 | 4/2018 | Chen et al. |
| 2018/0121202 A1 | 5/2018 | Chen et al. |
| 2018/0174350 A1 | 6/2018 | Maiyuran et al. |

OTHER PUBLICATIONS

Non-Final Office Action for U.S. Appl. No. 15/394,027, dated Apr. 11, 2018, 13 pages.

Notice of Allowance for U.S. Appl. No. 15/394,027, dated Oct. 24, 2018, 30 pages.

* cited by examiner

Graphics Processor Command Format
900

Graphics Processor Command Sequence
910

REPLICATING PRIMITIVES ACROSS MULTIPLE VIEWPORTS

CROSS-REFERENCE RELATED APPLICATIONS

This application claims the benefit of U.S. patent application Ser. No. 15/394,027 filed Dec. 29, 2016.

TECHNICAL FIELD

Embodiments generally relate to graphics processing. More particularly, embodiments relate to replicating primitives across multiple viewports.

BACKGROUND

United States Patent Publication No. 20160086299 describes a position-only shading pipeline. In position-only shading, two geometry pipes exist, a trimmed down version called the Cull Pipe and a full version called the Replay Pipe. Thus, the Cull Pipe executes the position shaders in parallel with the main application, but typically generates the critical results much faster as it fetches and shades only the position attribute of the vertices and avoids the rasterization as well as the rendering of pixels for the frame buffer. Furthermore, the Cull Pipe uses these critical results to compute visibility information for all the triangles whether they are culled or not. On the other hand, the Replay Pipe consumes the visibility information to skip the culled triangles and shades only the visible triangles that are finally passed to the rasterization phase. Together the two pipes can hide the long cull runs of discarded triangles and can complete the work faster in some embodiments.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
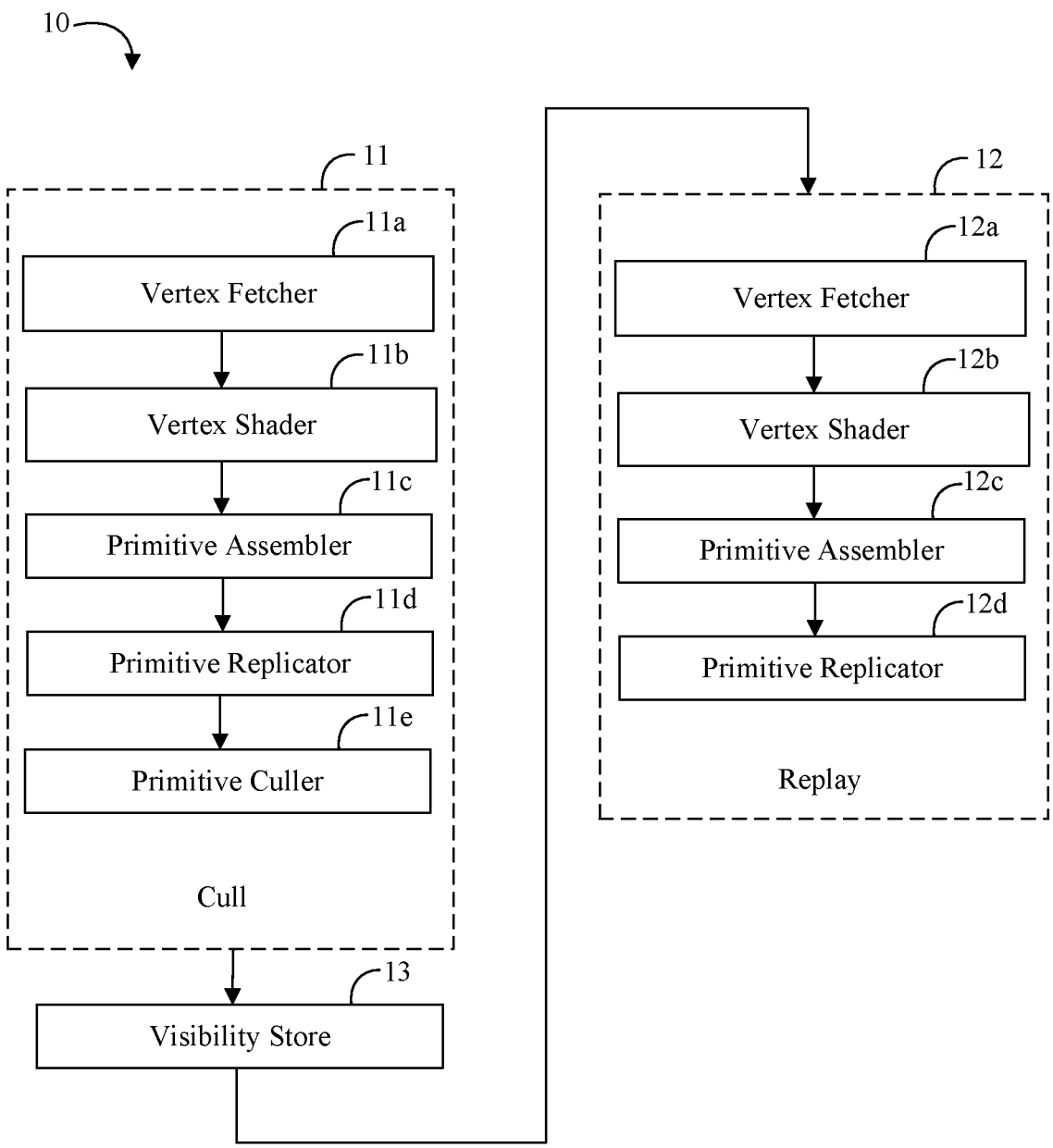
FIG. 1 is a block diagram of an example of a graphics processor system according to an embodiment.

Turning now to FIG. 1, an embodiment of a graphics processor system 10 may include a cull geometry pipeline 11 to cull geometries. The cull geometry pipeline 11 may include a first vertex fetcher 11a to fetch vertices, a first vertex shader 11b communicatively coupled to the first vertex fetcher 11a to shade the fetched vertices, a first primitive assembler 11c communicatively coupled to the first vertex shader 11b to assemble primitives, and a first primitive replicator 11d communicatively coupled to the first primitive assembler 11c to replicate primitives for at least a first and a second viewport. The system 10 may further include a replay geometry pipeline 12 which may include a second vertex fetcher 12a to fetch vertices, a second vertex shader 12b communicatively coupled to the second vertex fetcher 12a to shade the fetched vertices, a second primitive assembler 12c communicatively coupled to the second vertex shader 12b to assemble primitives, and a second primitive replicator 12d communicatively coupled to the second primitive assembler 12c to replicate primitives for at least the first and the second viewport. The system 10 may further include a visibility store 13 communicatively coupled between the cull geometry pipeline 11 and the replay geometry pipeline 12 to store visibility information related to the assembled primitives and the replicated primitives.

A primitive, for example, may correspond to a basic graphics construct. In some embodiments, a primitive may correspond to a collection of vertices which define a polygon or other shape. For example, a primitive may correspond to a triangle.

For example, the first and second primitive replicators 11d and 12d may each be further configured to adjust respective position attributes of the replicated primitives for the second viewport relative to the first viewport. In some embodiments of the graphics processor system 10, the cull geometry pipeline 11 may further include a primitive culler 11e communicatively coupled to the first primitive replicator 11d to cull primitives based on a visibility test. For example, the primitive culler 11e may be further configured to identify an original primitive as visible if any replicated primitive corresponding to the original primitive is identified as visible.

Embodiments of each of the above first vertex fetcher 11a, first vertex shader 11b, first primitive assembler 11c, first primitive replicator 11d, primitive culler 11e, second vertex fetcher 12a, second vertex shader 12b, second primitive assembler 12c, second primitive replicator 12d, visibility store 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C #or the like and conventional procedural programming languages, such as the "C" programming language or similar programming languages.

Figure 2:
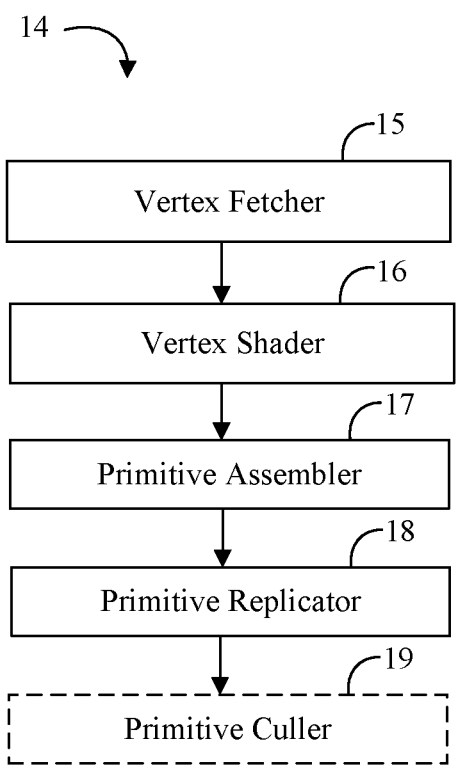
FIG. 2 is a block diagram of an example of a graphics processor pipeline apparatus according to an embodiment.

Turning now to FIG. 2, an embodiment of a graphics processor pipeline apparatus 14 may include a vertex fetcher 15 to fetch vertices, a vertex shader 16 communicatively coupled to the vertex fetcher 15 to shade the fetched vertices, a primitive assembler 17 communicatively coupled to the vertex shader 16 to assemble primitives, and a primitive replicator 18 communicatively coupled to the primitive assembler 17 to replicate primitives for at least a first and a second viewport. For example, the primitive replicator 18 may be further configured to adjust respective position attributes of the replicated primitives for the second viewport relative to the first viewport. Some embodiments of the graphics processor pipeline apparatus 14 may further include a primitive culler 19 communicatively coupled to the primitive replicator 18 to cull primitives based on a visibility test. For example, the primitive culler 19 may be further configured to identify an original primitive as visible if any replicated primitive corresponding to the original primitive is identified as visible.

In some embodiments of the graphics processor pipeline apparatus 14, the first viewport may correspond to a left eye viewport of a stereo virtual reality system and the second viewport may correspond to a right eye viewport of the stereo virtual reality system. Alternatively, for example, the first viewport may be part of a first set of viewports which correspond to a first face of a cube rendering system and wherein the second viewport may be part of a second set of viewports which corresponds to a second face of the cube rendering system. For example, there may be six viewports corresponding to each face of the cube. In another alternative example, the first viewport may correspond to a first cascade of a cascaded shadow map and the second viewport may correspond to a second cascade of the cascaded shadow map (e.g. for two or more viewports, only limited by the number of viewports).

Embodiments of each of the above vertex fetcher 15, vertex shader 16, primitive assembler 17, primitive replicator 18, primitive culler 19, and other components of the graphics processor pipeline apparatus 14 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C #or the like and conventional procedural programming languages, such as the "C" programming language or similar programming languages.

Figure 3A:
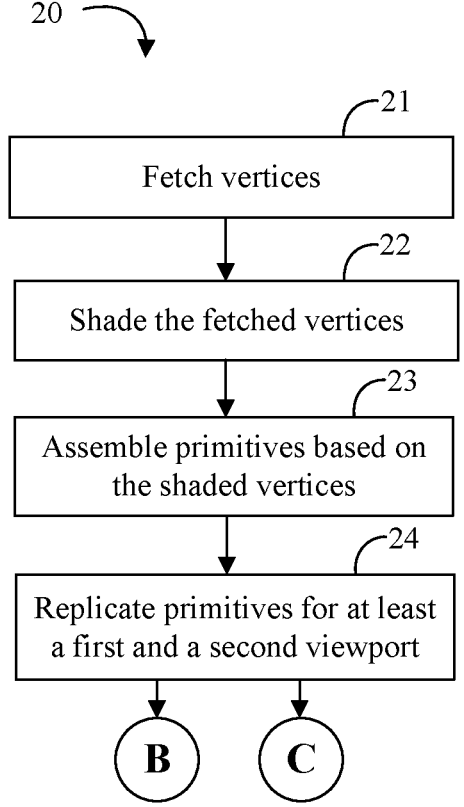
FIGS. 3A to 3C are flowcharts of an example of a method of processing graphics according to an embodiment.
Figure 3B:
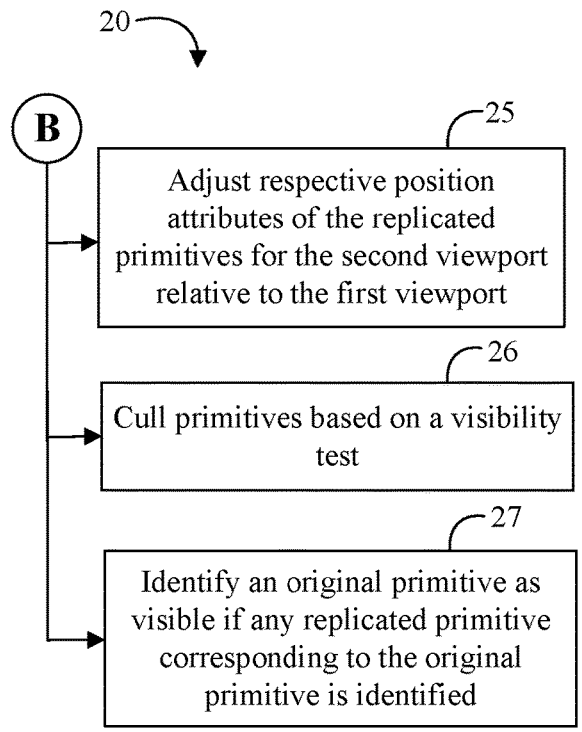
Figure 3C:
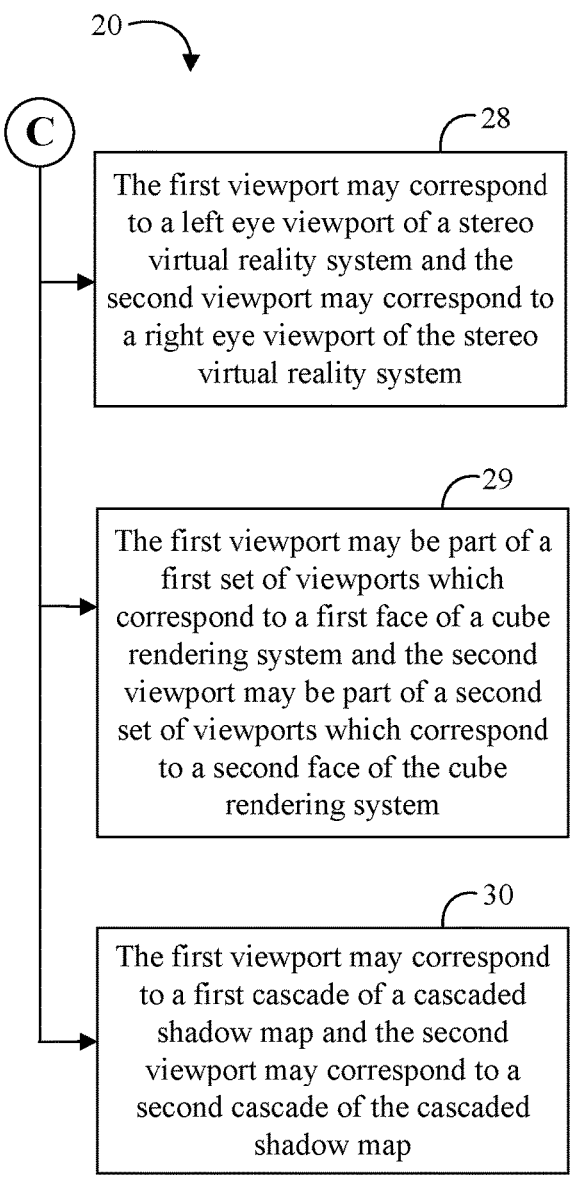

Turning now to FIG. 3, an embodiment of a method 20 of processing graphics may include fetching vertices at block 21, shading the fetched vertices at block 22, assembling primitives based on the shaded vertices at block 23, and replicating primitives for at least a first and a second viewport at block 24. The method 20 may further include adjusting respective position attributes of the replicated primitives for the second viewport relative to the first viewport at block 25. The method 30 may also include culling primitives based on a visibility test at block 26, and identifying an original primitive as visible if any replicated primitive corresponding to the original primitive is identified as visible at block 27. While some embodiments are described in connection with a first and second viewport, in practice some embodiments more utilize more than two viewports. For example, some embodiments may include up to sixteen (16) viewports or more.

In some embodiments of the method 30, the first viewport may correspond to a left eye viewport of a stereo virtual reality system and the second viewport may correspond to a right eye viewport of the stereo virtual reality system at block 28. Alternatively, for example, the first viewport may be part of a first set of viewports which correspond to a first face of a cube rendering system and wherein the second viewport may be part of a second set of viewports which corresponds to a second face of the cube rendering system at block 29. In another alternative example, the first viewport may correspond to a first cascade of a cascaded shadow map and the second viewport may correspond to a second cascade of the cascaded shadow map at block 30. As noted above, while some embodiments are described in connection with replicating primitives to a first and second viewport, in practice some embodiments may perform such replication to more than two viewports.

Embodiments of the method 20 may be implemented in a graphics processing system, GPU, or a graphics processor pipeline apparatus such as, for example, those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, the method 20 may be implemented on a computer readable medium as described in connection with Examples 19 to 25 below.

Figure 4:
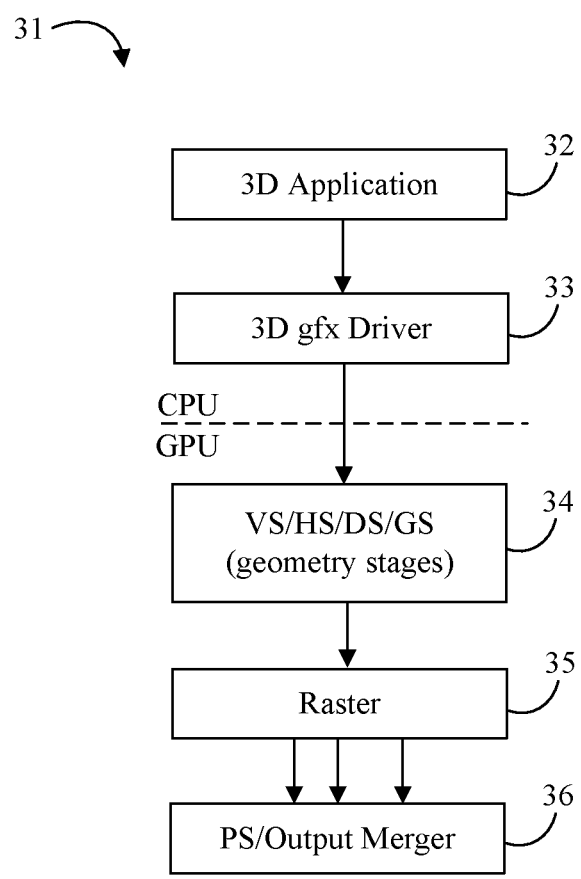
FIG. 4 is a block diagram of an example of an electronic processing system according to an embodiment.

Turning now to FIG. 4, an embodiment of an electronic processing system 31 may include a central processor unit (CPU) portion (e.g. above the dashed line) and a GPU portion (e.g. below the dashed line). The CPU portion may support graphics applications 32 (e.g. three dimensional (3D) applications) and graphics (gfx) drivers 33 (e.g. 3D gfx drivers), while the GPU portion may support geometry stages 34 (e.g. vertex shaders (VS), hull shaders (HS), domain shaders (DS), geometry shaders (GS), etc.), a raster stage 35, and a pixel shader (PS)/output merger stage 36. In some graphics and/or 3D applications, the same geometry may be projected into different viewports and/or render target array slices, with only the position attribute substantially varying between the different viewports/slices. Some usage scenarios include, but are not limited to virtual reality (VR), cubemap rendering and voxel lighting, and cascaded shadow maps. At the CPU portion, a conventional graphics application may use multi-pass rendering and/or replicate draw-calls at the DirectX/OpenGL application programming interface (API) level for the various viewports/slices. Multi-pass rendering or multiple draw calls, however, may incur a performance overhead in the CPU portion (e.g. the graphics application 32 and/or graphics driver 33). At the GPU portion, replication may occur at the geometry stage 34 (e.g. a geometry shader). Replication at the geometry stage 34, however, also hinders GPU performance optimizations by separating similar geometry objects so there is little cache reuse. GPUs may also incur heavy performance overhead in enabling the geometry shaders in the GPUs and not all APIs support the geometry shaders.

Advantageously, some embodiments of the electronic processing system 31 may perform primitive replication at the raster stage 35. For example, new API constructs may enable primitive replication at the raster stage 35, improving CPU-level overhead and avoiding problems incurred by geometry stage replication. In particular, in some embodiments a graphics processor (e.g. the GPU portion) may include a geometry stage to process geometries and a raster stage communicatively coupled to the geometry stage, where the raster stage 35 may include a primitive assembler to assemble primitives and a primitive replicator communicatively coupled to the primitive assembler to replicate primitives for at least a first and a second viewport.

In accordance with some embodiments, a method and/or apparatus may enable the primitives to be replicated across multiple viewports with per viewport changes in the position attribute. Advantageously, replicating primitives for multiple viewports with per viewport changes in the position attribute may enable graphics software to perform operations such as stereo rendering, cube map rendering, and/or cascaded shadow map generation in a single pass thus saving on repeating, for example, vertex shading and tessellation. Some embodiments may also provide an implementation for effective primitive replication per viewport in a position only shader based GPU architecture and GPUs using tile based rendering.

Figure 5:
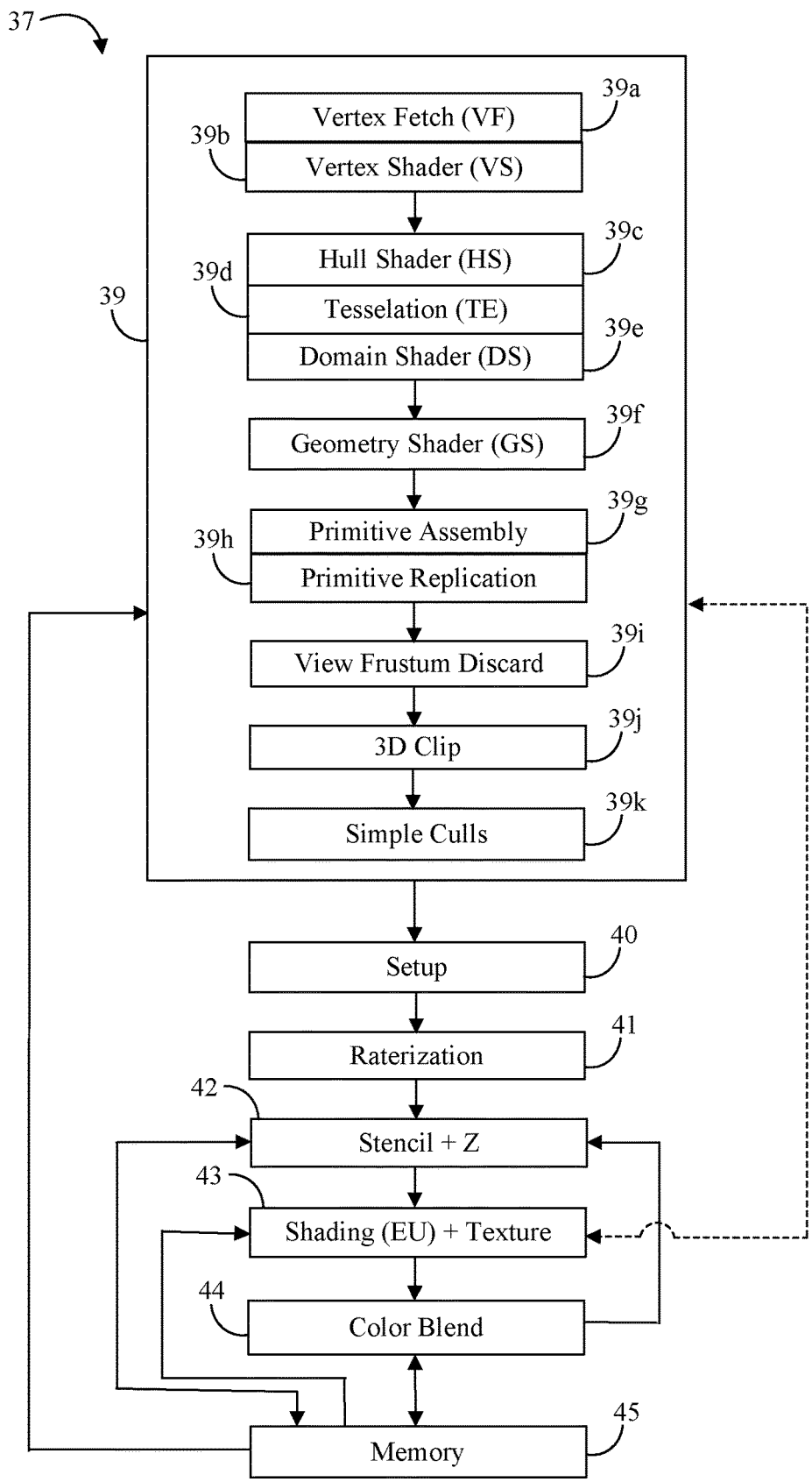
FIG. 5 is a block diagram of an example of a graphics processor unit (GPU) architecture according to an embodiment.
Figure 6:
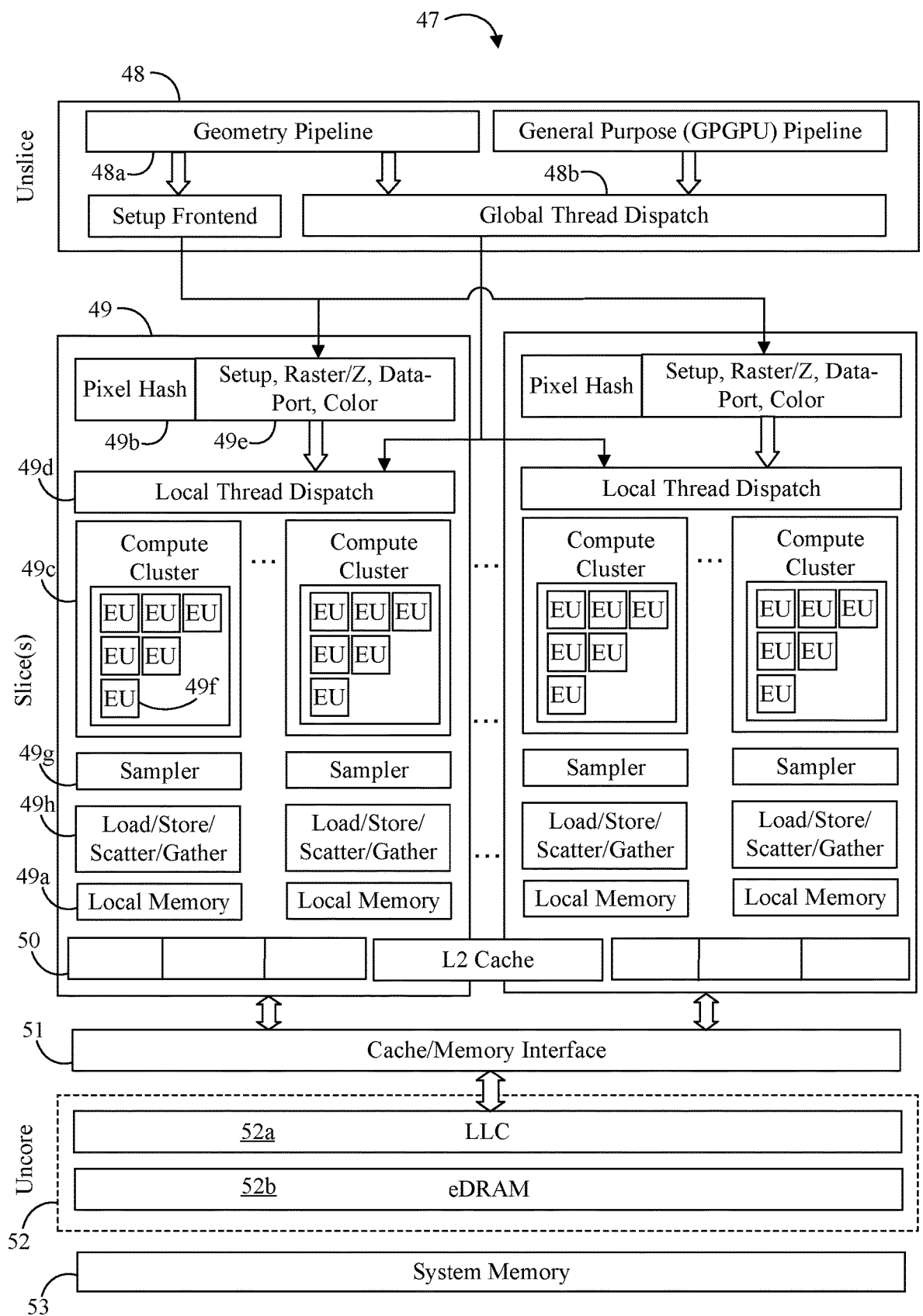
FIG. 6 is a block diagram of an example of a GPU microarchitecture according to an embodiment.

Turning now to FIGS. 5 and 6, an embodiment of a GPU architecture 37 may follow a virtual geometry pipeline 39 in which the vertices are transformed via vertex shaders 39b-f, then the pixels are rasterized from triangles, which are then pixel shaded and written to the frame buffer. FIG. 5 shows a higher level view of the baseline GPU architecture 37 that matches the API and the programming model while FIG. 6 illustrates a more detailed microarchitecture 47 of the baseline GPU. The GPU may be a unified shader model and may consist of three parts: unslice 48, slice 49 and uncore 52.

In some embodiments, a 3D image may start out as a collection of triangulated surfaces where vertices of the triangles define the shape of the object. An input list of these vertices may be provided to a vertex fetcher (VF) 39a that in turn fetches the attributes associated with the vertices from memory. In a subsequent vertex shader (VS) 39b, the fetched attributes of the vertices are transformed using the programmable shaders. For example, a programmable shader may act as a subroutine that maps vertices onto the screen and add special effects to the objects in a 3D environment by performing mathematical operations on their attributes. These shaders are dispatched to the thread processors—referred as execution units (EUs)—where the attributes of vertices like position, color, texture-coordinates etc. are transformed and the computed values are stored in the local memory 49a for reference by the subsequent pipe stages. The output of the VS unit goes to the next pipeline stages, which may include HS 39c, tesselation 39d, DS 39e, and GS 39f, if applicable, or sent to the primitive assembler 39g where the triangles (e.g. primitives) are created. Advantageously, some embodiments of the graphics processor 37 may include a primitive replicator 39h communicatively coupled to the primitive assembler 39g to replicate the triangles, as described in detail herein.

After creation of the triangles and replication of the triangles, a first clipping stage 39i may discard the triangles that are outside the viewport frustum on a per viewport basis. The triangles that are within the planes of the viewport frustum are accepted and sent to the subsequent pipe stages. Moreover, another clipping stage 39j may also clip the triangles that intersect with the planes of the view frustum. The triangles that survived the viewport frustum discards and clip operations may yet again be examined by a simple cull stage 39k to confirm whether the triangle will be part of the final image or not, and the objects that fail these tests may be thrown away (e.g., discarded or disregarded). For example, the back facing, degenerate, zero area etc. triangles may be discarded in the simple cull stage 39k. As described below, for some applications more than about eighty percent (80%) of the triangles may be discarded either by the viewport frustum clipping stage 39i or simple cull stage 39k. Finally, the passing triangles may be sent to a setup unit 40.

Another part of the baseline architecture 37 is the pixel pipe that contains the rasterization 41, stencil and depth 42, the shading and texture 43 and color clusters 44. The pixel pipe begins with the rasterization unit 41 that may determine the location of all the pixels that either lie inside or on the edges of the triangles sent by the geometry pipe 39. Further, it divides the triangles into symmetrical blocks of pixels that may be sent to the depth (Z) pipe 42 for depth test. As multiple objects in the 3D scene can map to the same position, the depth pipe 42 may determine whether the pixels embedded in the block are closest to the observer or are hidden by the previously observed pixels belonging to a different object. The pixels that pass the depth tests may then be shaded (shading and texture unit 43) for determining their color and other attributes related to them. Finally, the computed values of the pixels may be sent to the color pipe 44 that may either optionally blend the computed values with the previously known states or send them to update the frame buffer.

As shown in FIG. 6, the geometry pipeline 39 from the vertex fetcher 39a through the simple cull stage 39k may be similarly provided as geometry pipeline 48a in the unslice portion 48 of the microarchitecture 47. The programmable shaders emanating from the geometry pipe 48a may be dispatched to the local thread processors 49d via global thread dispatch 48b and the computed values may be recorded in the local memory 49a. The passing triangles from the geometry pipe 48a may be shipped to the slices 49 where they may be divided into symmetrical blocks of pixels via the rasterization walk. The pixel blocks may be hashed via the pixel hashing mechanism 49b to decide whether the block is going to be rendered in the slice or not. The hashing mechanism 49b may be responsible not only for the load-balance but also to maintain the pixel-coherency.

As described above, multiple triangles in a 3D scene may overlap and it may be incumbent upon the hashing mechanism 49b to send the pixel block at a given screen coordinate to the same slice 49 as well as the same compute cluster 49c via a local thread dispatch 49d. This may be done in order to maintain the depth and the color coherency of the pixels. Further, the slice portion 49 of the micro architecture may be divided into two functional blocks, namely a pixel pipe 49e and the compute clusters 49c. As described above, the pixel pipe 49e may contain the rasterization, depth and color cluster while the compute cluster 49c may encompass the array of EUs 49f used for executing programmable shaders. Each EU 49f may support multiple thread contexts with different single instruction multiple data (SIMD) widths—i.e. 8, 16 or 32 in one embodiment. Internally, an EU 49f may have two pipes that are quad-pumped. Each pipe may have four-stream SIMD processors and may execute both floating point and scalar instructions. Each compute cluster 49c may also have a shared texture-sampling unit 49g and a load/store unit 49h that may do gathered reads as well as scattered writes. In addition, the shared functions may have their own private caches backed up by the unified L2 cache 50 as shown in FIG. 6. Finally, similar architecture generations may try to satisfy diverse market segments, for example, from phone/tablet devices to high-end gaming computers. Thus, similar architecture generations might support products that have different numbers of compute clusters 49c and slices 49.

In some embodiments, the uncore 52 may encompass a cache/memory interface 51, a last level cache(s) (LLCs) 52a as well as the memory 53. Just like the slices 49, the uncore configuration may also be dependent upon the market segment. For example, high end configurations may have a last level cache along with embedded-dynamic random access memory (eDRAM) 52b while the configuration for a phone/tablet may have a memory controller and system memory.

Advantageously, some embodiments of the GPU architecture 37 and/or microarchitecture 47 may replicate primitives across multiple viewports with position attribute varying per viewport in single geometry pass. In some embodiments, this feature may enable graphics software to perform operations such as stereo rendering, cube map rendering and cascaded shadow map generation using a single pass thus saving on, for example, repeated vertex shading and tessellation. In some embodiments, this feature may also allow the flexibility of evaluating the positions at different views with an arbitrary transform that can be applied to the original position. For example, some embodiments may allow for arbitrarily computed position attributes to be replicated across multiple viewports.

The following are non-limiting examples of usage scenarios where a same geometry with identical attributes may be projected into different viewports and/or render target array indices, and only the position attribute varies.

1. Stereoscopic rendering: the primitive replicator may replicate primitives into two viewports, one each for left and right eye viewports. For example, each viewport may have different offsets in X/Y directions.

2. Cubemap rendering/voxel lighting: the primitive replicator may map primitives onto all 6 cube faces at once and/or compute light contribution for each of 6 voxel faces at once. For example, each viewport may project onto/from a different plane.

3. Cascaded shadow maps: the primitive replicator may compute shadow maps for multiple inset sections (cascades) with a single geometry pass. In this example, all viewports have unmodified coordinates.

Without being limited to specific implementations, some useful example API features may be provided in accordance with various embodiments. Providing an API feature to replicate primitives across viewports may be useful in applications such as, for example, stereo rendering for 3D TV (e.g. with eye tracking), stereo rendering for virtual reality, cube map generation, and cascaded shadow maps. Providing an API feature to replicate primitives across viewports and render target array indices (RTAI) may be useful in applications such as, for example, cube map generation and cascaded shadow maps. Providing an API feature to apply a position offset may be useful in applications such as, for example, stereo rendering for 3D television (TV) with eye tracking (e.g. for XYW) and stereo rendering for virtual reality (e.g. for X). Providing an API feature to apply a position swizzle may be useful in applications such as, for example, cube map generation (e.g. for XYW). Providing an API feature to apply a position negation may be useful in applications such as, for example, cube map generation. Further details are provided in non-limiting example use cases I, II, and III below.

USE CASE I: Virtual Reality—left/right eye rendering:
1. Actors: Human w/VR set, VR application, 3D driver/GPU;
2. Goal: Left/right eye image projected on VR set;
3. Example Sequence of Events:
  a. Human starts VR application wearing VR set;
  b. VR application uses new API to configure 2 viewports in 3D driver;
  c. VR application uses new high level shading language (HLSL) construct to compute per-viewport position attributes and broadcast other attributes across viewports;
  d. VR application submits one set of draw-calls, common to both eyes; and
  e. VR set displays two images, with replicated geometry and shifted per eye view.

USE CASE II: Cube Map Rendering:
1. Actors: 3D application, 3D driver, GPU;
2. Goal: Cube Map rendered in single pass (one draw-call);
3. Example Sequence of Events:
  a. 3D application uses new API to configure 6 viewports in 3D driver;
  b. 3D application uses new HLSL construct to broadcast geometry across viewports from VS, with different XYZW (e.g. where X, Y, Z are coordinates and W indicates a particular viewport) swizzles and negations (6 cube faces); and
  c. 3D application submits one set of draw-calls to generate all 6 cube faces.

USE CASE III: Cascaded Shadow Maps:
1. Actors: 3D application, 3D driver, GPU;
2. Goals: Shadow Map Cascade rendered in single pass (one draw-call);
3. Example Sequence of Events:

a. 3D application uses existing API to configure N viewports in 3D driver, with different height/width;

b. 3D application uses new HLSL construct to broadcast geometry across viewports from VS; and c. 3D application submits one set of draw-calls to generate all N shadow map cascades in one pass.

Figure 7:
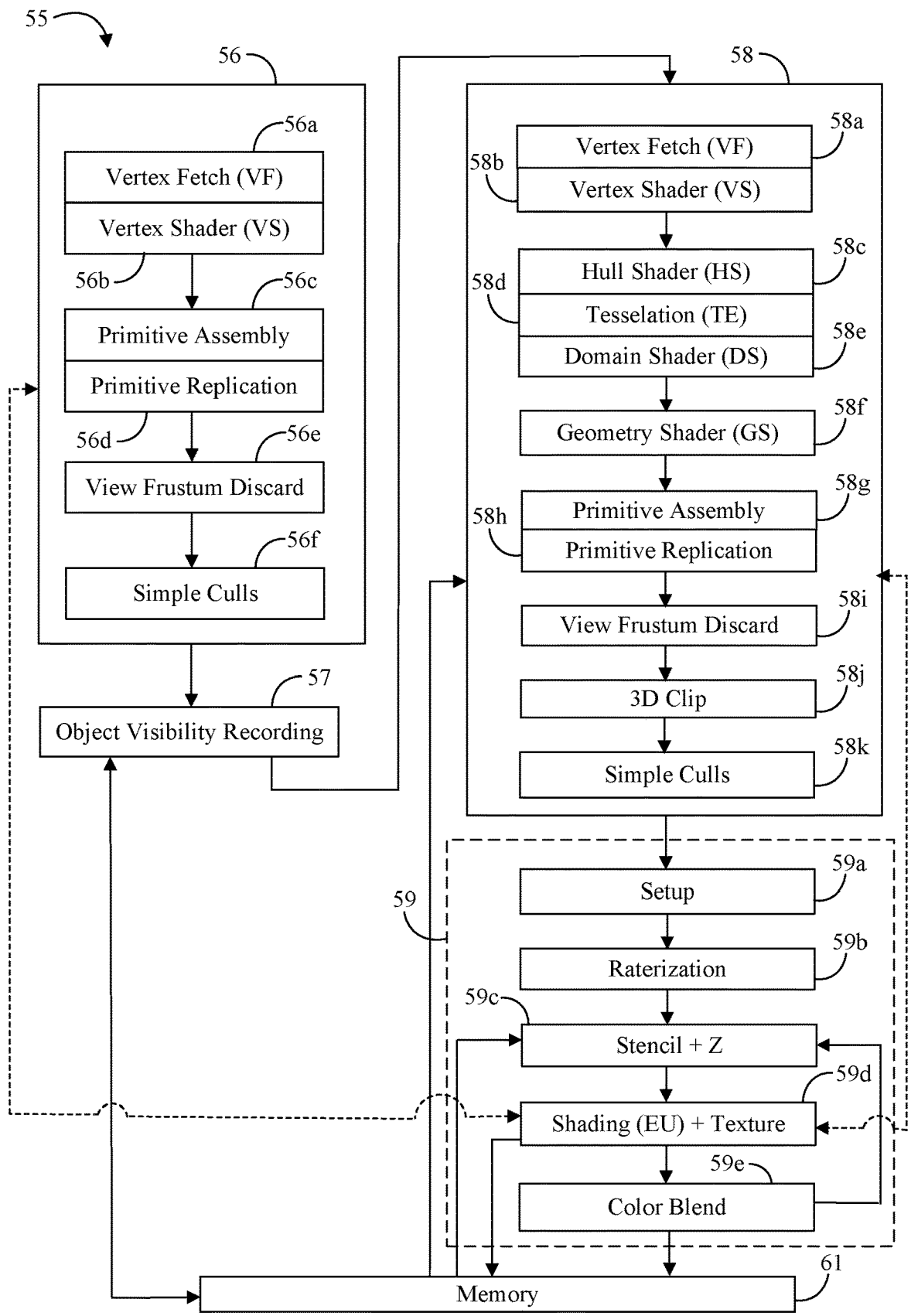
FIG. 7 is a block diagram of another example of a GPU architecture according to an embodiment.

Turning now to FIG. 7, some embodiments advantageously may also perform primitive replication in a GPU architecture 55 which includes a position only shading (POSH) pipeline where primitives can be replicated to multiple viewports and discard checks can be performed on them on per view basis and render only such primitives that have at least one view visible in them. Advantageously, some embodiments of the GPU architecture 55 may lower API/driver processing overhead for VR/Stereo applications. Some embodiments of the GPU architecture 55 may exhibit a benefit in GPU performance as compared to an API level replication method and exhibit higher performance as compared to a geometry shader replication method.

The GPU architecture 55 may include two geometry pipes, namely a first geometry pipe referred to as a cull pipe 56 and a second geometry pipe referred to as a replay pipe 58. Both the pipes 56, 58 may execute different instances of the same application where each instance may be working on a completely different draw-call. The responsibility of the cull pipe 56 may be to compute the visibility information of the triangles, whether the triangle is rejected or not. The visibility information determined by the cull pipe 56 may be stored in a visibility recording register 57 (e.g. a first-in-first-out (FIFO) register), which may be communicatively coupled between the cull pipe 56 and the replay pipe 58. The information stored in the visibility register 57 may in turn be consumed by the replay pipe 58 for skipping the discarded triangles. Moreover, the cull pipe 56 may generate this critical information faster by only fetching and shading the position attributes, for example, as a position-only shader. In this way, both the pipes 56, 58 may work together for not only reducing the amount of work required for the culled triangle sequences but also for efficiently skipping them.

The replay pipe 58 may be configured similarly to the pipeline 39 from FIG. 5, including a vertex fetcher 58a, a vertex shader 58b, a hull shader 58c, a tessellation unit 58d, a domain shader 58e, a geometry shader 58f, and a primitive assembler 58g. The replay pipe 58 advantageously may further include a primitive replicator 58h communicatively coupled to the primitive assembler 58g to replicate the assembled primitives on a per viewport basis. The replay pipe 58 may further include a first culler 58i to perform view frustum discards, a 3D clipper 58j to clip triangles which intersect the view frustum, and a simple culler 58k to perform simple culls on the triangles.

As shown in FIG. 7, the primitive replicator 58h is provided in the graphics pipeline just after the primitive assembler 58g. The primitive replicator may be responsible for accepting one input primitive at a time and then generating multiple replicas of the original primitive for each of the programmed viewports with some adjustments made to, for example, the system interpreted values such as a viewport index, a render target array index, and/or a layer index.

The remainder of the graphics pipeline 58 may perform as described earlier by accepting one triangle at a time doing discard tests and culls for one view at a time. Likewise, the GPU architecture 55 may further include a pixel pipe 59 (e.g. including setup unit 59a, rasterization unit 59b, stencil and depth unit 59c, shading and texture unit 59d, and color blend unit 59e) and a local memory 61.

As shown in FIG. 7, a similar primitive replicator 56d is added to the cull pipe 56 also and all the replicas may be generated post primitive assembly. The cull pipe 56 may further include a vertex fetcher 56a, a vertex shader 56b, a primitive assembler 56c, a first culler 56e to perform visibility tests for the primitives and/or to cull primitives outside the view frustum, and a simple culler 56f to perform simple culls on the primitives. All the assembled and replicated primitives may undergo viewport discard and simple cull tests. A visibility stream may be recorded per original triangle marking each of the triangles as visible if any replica of the triangle is visible. The visibility stream may record a triangle as not visible only if all the replicas are rejected because of visibility tests.

Alternatively, in some embodiments, the cull pipe 56 may be programmed to have a conservative viewport covering the entire view frustum common to all the views. In this alternative example, the cull pipe 56 may not need to replicate any primitives but may just perform the visibility tests on a per assembled primitive basis and record the visibility stream.

In addition to potential performance improvements, position-only shading also provides opportunity to save power and enhances the scalability of the architecture 55. The resources inside the GPU may be utilized via the cull pipe 56 such that the GPU may complete the computation of critical work faster.

Typically, the shading attributes may include position, normal, color and texture coordinates as examples. In some embodiments when position-only shading is to be implemented, only the position attributes may be read from memory rather than reading all the attributes and then selecting the position attributes out. This saves time, compute cycles and memory bandwidth in some embodiments. Thus in some embodiments, during the vertex fetch, only the position attributes may be fetched by the vertex fetcher 56a. in some embodiments, the computation of position shaders may be decoupled further in time such that the GPU can effectively hide some cull sequences. A mechanism may "pre-execute" the position shaders and may effectively consume its latency on behalf of the main application such that long running culled sequences can be skipped. In short, a position-only shader may not only realize performance gains but may also saves power by doing less work for discarded vertices in some embodiments.

Some of the pipe stages, such as tessellation and geometry-shader may be omitted from the cull pipe 56, in some embodiments. If a draw call includes tessellation, geometry shader, or other function not implemented in the cull pipe 56, the cull pipe 56 skips that draw call and the replay pipe 58 may handle that draw call a regular manner. For example, the replay pipe 58 may not expect the visibility information for that draw call. To accomplish this, a driver may set a bit in the draw call command indicating whether the command comes into the domain of cull pipe 56 or not. Similarly, there can be conditions when the vertex-only draw calls may require information that is computed via the pixel shaders of the previous draw calls. This may happen very rarely in applications but the driver may still set the bit indicating that these kinds of draw calls will not be handled via the cull pipe 56. The replay pipe 58 includes the discard/clip/cull stages in its pipeline to handle those situations. In some embodiments, the cull pipe 56 may not include a 3D clipper, so the triangles that intersect with the view frustum planes may be treated as passed (e.g. they may be marked as visible in the cull pipe 56). The replay pipe 58 may then handle all of the primitive clipping.

The visibility FIFO 57 may record the information as bitwise sequence for every triangle of a draw call. For example, a zero (0) for the failing triangle and a one (1) for a passing triangle. This information present in the FIFO 57 may be generated via the cull pipe 56 and may be consumed by the replay pipe 58 for skipping the discarded triangles. In some embodiments, the size of the FIFO 57 may govern how far the cull pipe 56 can run ahead, and hence, can impact the performance of the architecture.

In some embodiments, the position-only shading may be disabled. A draw call driver, for example, may selectively choose to enable or disable visibility recording. For example, if there are only a few vertices in the draw call, the overhead associated with visibility recording may not justify the cost of visibility recording in terms of time, memory bandwidth and compute cycles. Other examples where visibility recording may be disabled for a particular draw call include lines and cases where all the vertices in the draw call are known to be visible. When position-only shading is disabled, the replay pipeline may not look for any bitwise information for that draw call and there may be no visibility information for the entire draw call.

The local memory 61 may be used for recording the shaded attributes of the vertices that are referenced both by the discarding logic in the geometry pipes 56, 58 as well as the pixel pipe 59 for rendering pixels. Recall that vertices may have an arbitrary number of attributes like position, normal, color, texture-coordinates, etc. These attributes may be shaded by various vertex shaders and the outcomes may be recorded in the local memory 61 for future reference. The recorded information may be dereferenced whenever it is no longer required. For example, the information may be dereferenced when a triangle is discarded by the culling logic or when all the pixels for a given triangle are rendered. In some embodiments, the local memory 61 may be a free-list of registers that are allocated for a vertex and then returned to the pool when not required.

Culling techniques may improve performance in a graphics processor. Some techniques include backface culling, view frustum culling, Z-max occlusion culling, and occlusion queries. In general, a culling technique reduces the amount of unnecessary work done to render an image, e.g., by discarding triangles that are fully outside the field of view (also called the view frustum in graphics). In general, the earlier culling tests may be preferred in a graphics pipeline because then the data can be discarded in the pipeline earlier, and the costs can be reduced. Z-max occlusion culling may be performed earlier using a position-only shading (POS) pipeline, for example, such as the cull pipe 56.

Without being limited to specific implementations, some useful example data structures may be provided in accordance with various embodiments. A state packet according to an embodiment may be defined that may be exposed to an API as an additional 3D state structure referred to as 3DSTATE_PRIMITIVE_REPLICATION. This state structure may be input, for example, by the primitive replicator 56d or 58h and the information provided may be used in the primitive replication process.

```
typedef struct 3DSTATE_PRIMITIVE_REPLICATION {
INT numReplicas;
INT replicaMask;
INT[16] VPAIoffsets;
INT[16] RTAIoffsets;
}
```

Where:
numReplicas: Specifies the number of replica positions produced by the last pre-raster shader. This value matches the position array length of the last pre-raster shader;
replicaMask: Specifies which replicas should be drawn. If bit k (0<=k<16) is clear, then replica k will not be rasterized. Bits k>=numReplicas may be ignored;
RTAIOffsets: Specifies an offset to add to SV_RenderTargetArrayIndex for each replica (e.g. where SV may indicate a system generated value); and
VPAIOffsets: Specifies an offset to add to SV_ViewportArrayIndex for each replica.

In some embodiments, a data structure referred to as "POS" and a vertex header data structure referred to as "VERTEX HEADER" may also be defined that contains an array of position attributes along with other data associate with vertex data (e.g. where VPI corresponds to a viewport index). This data structure may be populated by the last active shader stage before the rasterizer.

```
typedef struct POS {
FLOAT X;
FLOAT Y;
FLOAT Z;
FLOAT W; }
typedef struct VERTEX_HEADER {
INT32 RTAI;
INT32 VPI;
INT32 PointWidth;
POS[numReplica] POSITION;
}
```

Figure 8:
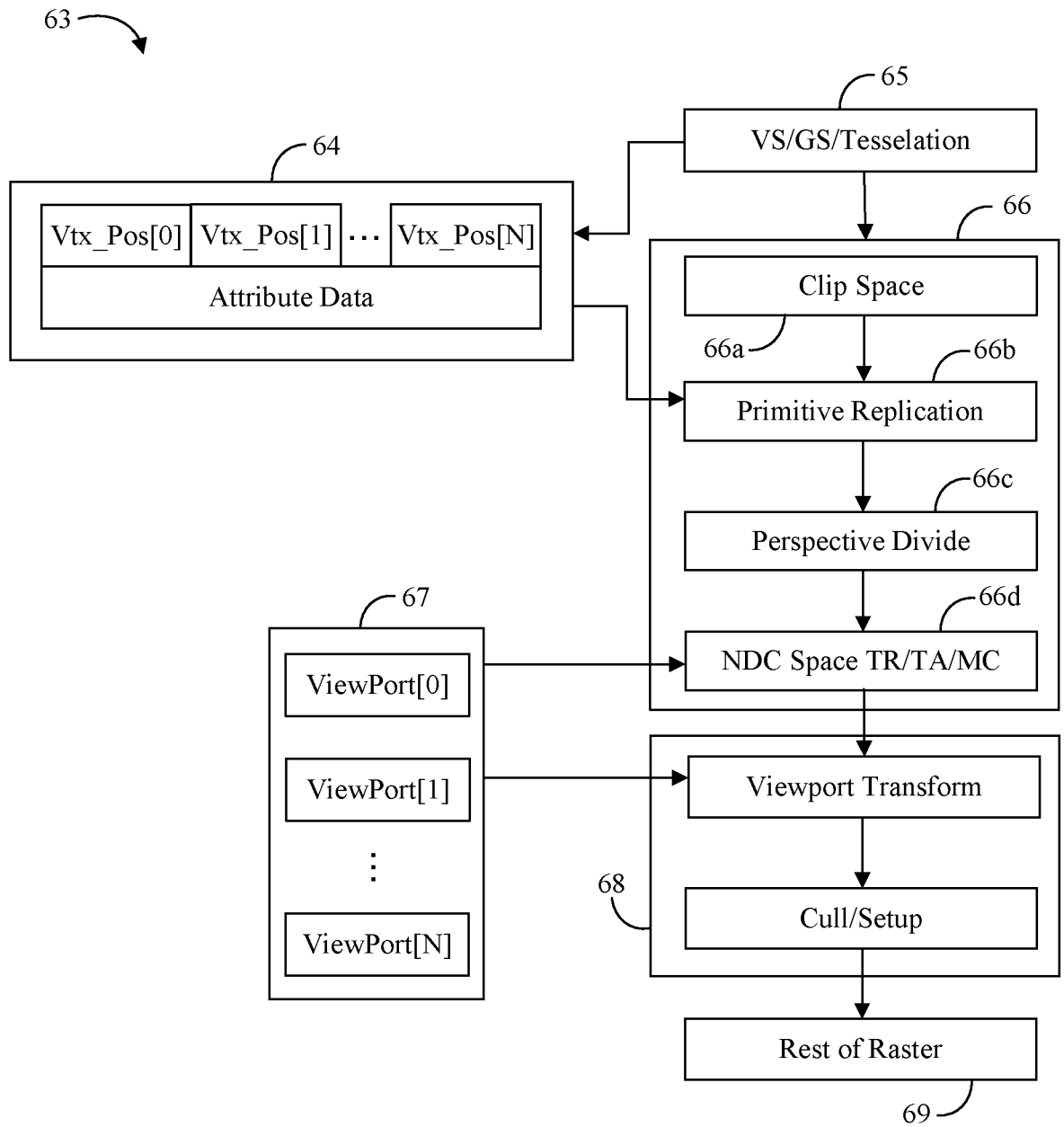
FIG. 8 is a block diagram of another example of a graphics processor pipeline apparatus according to an embodiment.

Turning now to FIG. 8, an embodiment of a graphics processing system 63 which may utilize the above-described data structure(s) includes a last active vertex shader stage 65. The last active shader stage 65 before the primitive assembly may write multiple positions (e.g. Vtx_Pos[0] through Vtx_Pos[N] for N+1 viewports) into the vertex 64 along with the header if primitive replication is enabled by the state. A primitive replication block 66b may input these vertices, create the object, and replicate the primitives as per the state parameters by appropriately offsetting the viewport and render target indices. A first clipper 66a may generate the right vertex data addresses for accessing the multiple positions but may use the same address for the attribute data. All the new positions may go through the perspective divide 66c and clip test logic 68. The remainder of the functions may happen normally on the replicated primitives.

Figure 9:
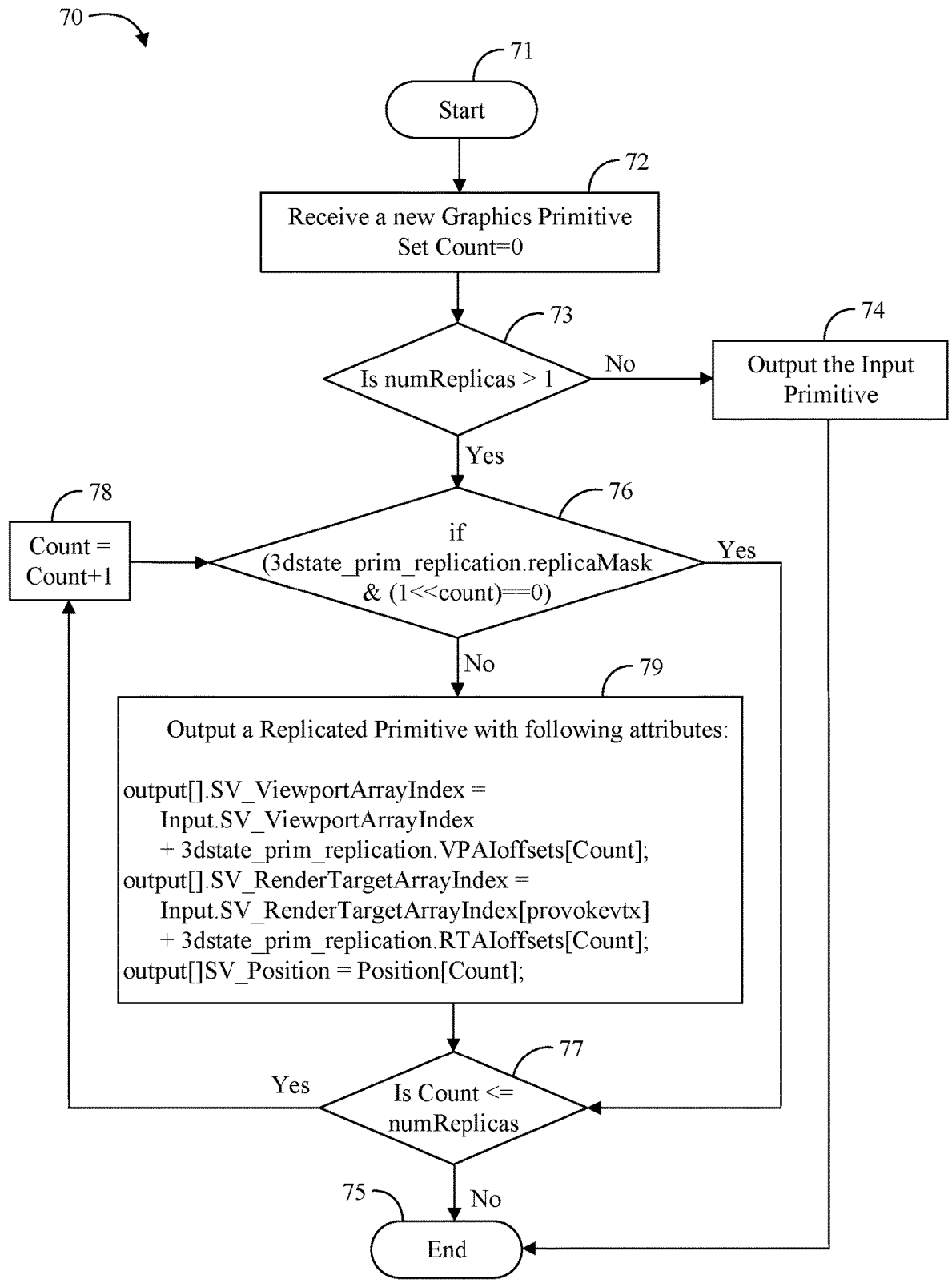
FIG. 9 is a flowchart of an example of a method of replicating primitives according to an embodiment.

Turning now to FIG. 9, an embodiment of a method 70 of replicating primitives (e.g. in a replay pipe) may start at block 71. The method 70 may include receiving a new graphics primitive and setting "Count" to zero at block 72. If the number of replicas (e.g. numReplicas) is not greater than 1 at block 73, the input primitive may be output at block 74 and the method 70 ends at block 75. If the number of replicas (e.g. numReplicas) is greater than 1 at block 73, a further determination is made at block 76.

At block 76, if the bit in the replica mask is clear (e.g. 3dstate_prim_replication.replicaMask & (1<<Count)==0), then the method 70 continues at block 77. Otherwise, the following block 79 may include outputting a replicated primitive with the following attributes: output[ ]. SV_ViewportArrayIndex=Input.SV_ViewportArrayIndex+ 3dstate_prim_replication.VPAIoffsets[Count]; output[ ]. SV_RenderTargetArrayIndex=Input.SV_ RenderTargetArrayIndex[provokevtx]+3dstate_prim_replication.RTAIoffsets[Count]; and output[ ]SV_Position=Position[Count]. After block 79, the method continues at block 77.

At block 77, if Count is less than or equal to the number of replicas (e.g. Count<=numReplicas), then Count is incremented at block 78 (e.g. Count=Count+1) and the method continues at block 76. If Count is greater than the number of replicas at block 77, the method 70 ends at block 75. Following the method 70, a primitive replication block (e.g. in the replay pipe) may input an original triangle with the 3DSTATE_PRIMITIVE_REPLICATION data structure. Depending on the state replica count, the primitive replication block may decide either to output the original primitive as it is or output multiple replicas of the primitive with different attributes, for example, as described in FIG. 6.

Figure 10:
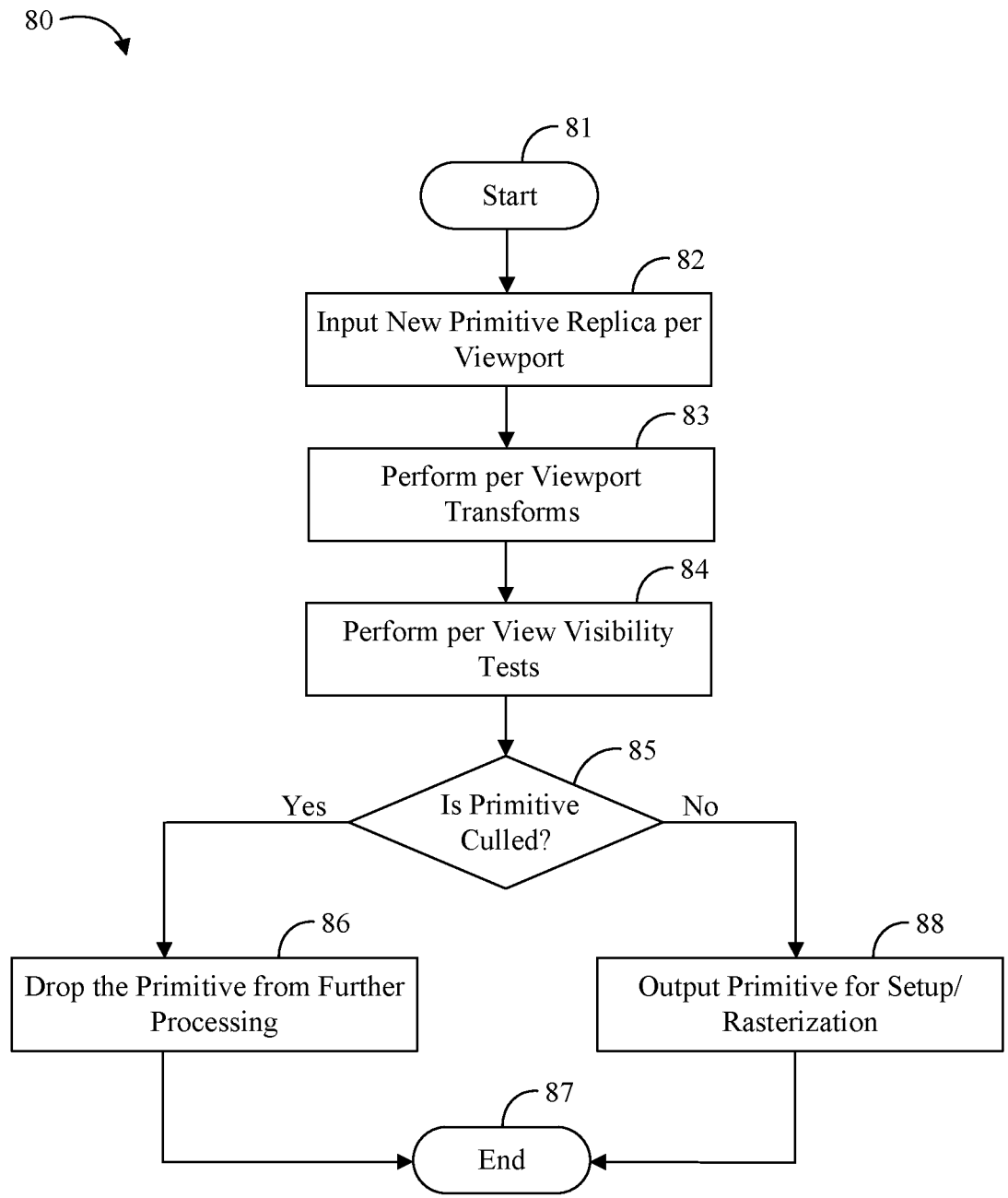
FIG. 10 is a flowchart of an example of a method of processing primitives according to an embodiment.

Turning now to FIG. 10, an embodiment of a method 80 of processing original and replicated primitives (e.g. in the replay pipe) may start at block 81 (e.g. after being output from a primitive replication block). The method 80 may include inputting an original or replicated primitive on a per viewport basis at block 82. The input primitives may then be transformed on a per viewport basis at block 83. Each of the primitives may then undergo per viewport visibility tests at block 84 and may either be sent to the rasterization at block 88 (e.g. if the primitive is not culled at block 85) or dropped based on the result of the visibility test at block 86 (e.g. if the primitive is culled at block 85). After the end of the processing at block 87, the original and replicated primitives that are sent to further processing will generally have a different set of positions, viewport indices, and/or render target indices (or layer indices).

Figure 11:
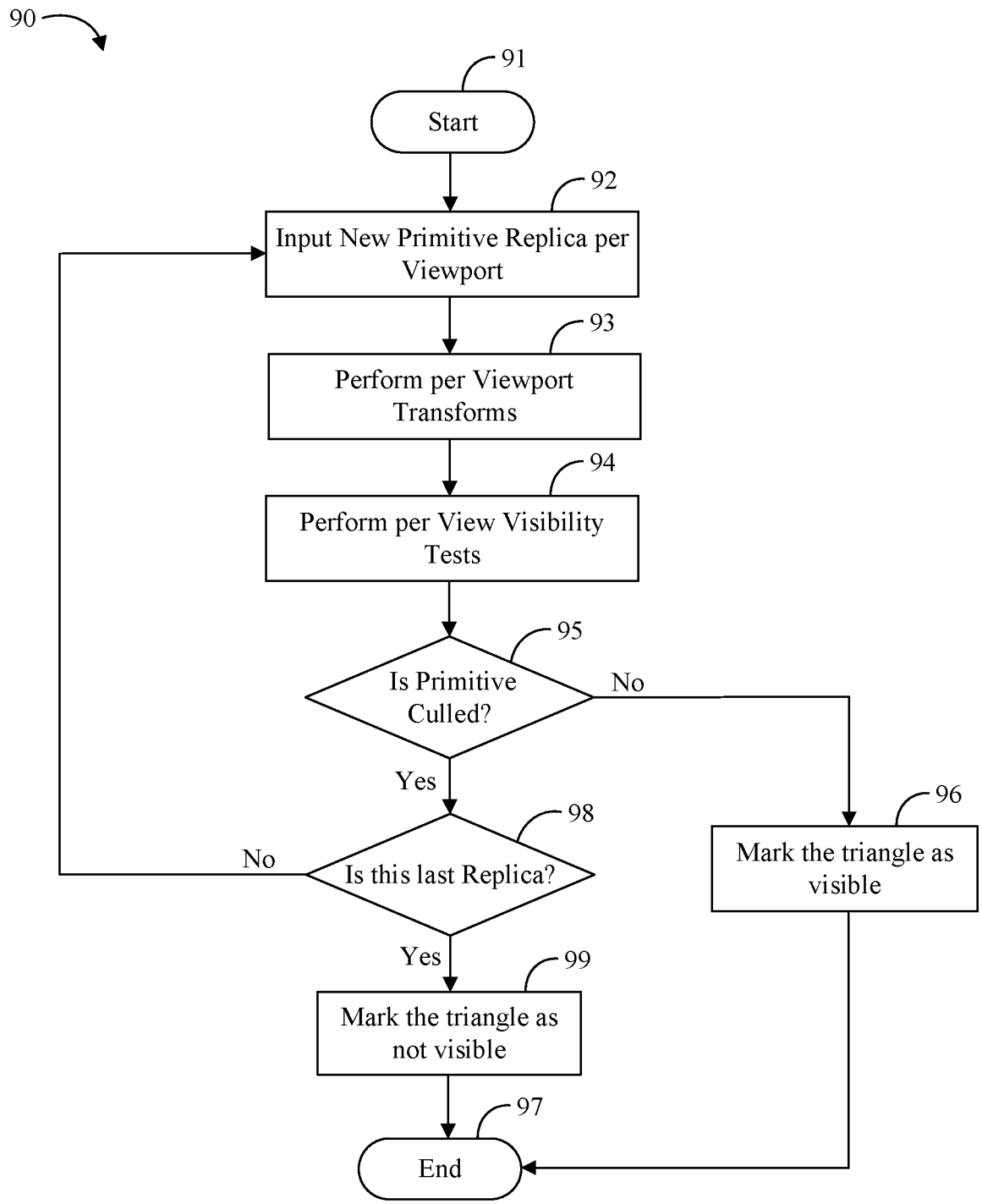
FIG. 11 is a flowchart of another example of a method of processing primitives according to an embodiment.

Turning now to FIG. 11, an embodiment of a method 90 of processing primitives (e.g. in the cull pipe) may start at block 91 (e.g. after being output from the primitive replication block). The method 90 may include inputting an original or replicated primitive from the primitive replication block at block 92, transforming each primitive on a per viewport basis at block 93, and performing a visibility test for each primitive on a per viewport basis at block 94. At block 95, if the original primitive or any replica based on the original primitive passes the visibility test then the original primitive is marked as visible and the method 90 ends at block 97 (e.g. after which the primitives may be sent along for bit stream encoding). If a replicated primitive gets culled at block 95, then if there are more replicas at block 98 the next replica may be iterated through the same process starting back at block 92. If block 98 determines that the last replicated primitive based on an original primitive has also been culled (e.g. all the replicas have been culled), then the original primitive is marked as not visible at block 99 and the method 90 ends at block 97.

Although above method(s) shows various implementation options, other variants of methods and algorithms may be used to encode how many views are visible per triangle or batch of triangles. This information can be used in the replay pipe and replicate to only those set of views that are marked visible. Advantageously, some embodiments may allow substantial amount of geometry processing reductions including, for example, the vertex shader, hull shader, domain shader, and geometry shader executions in the various usage models described herein, particularly for stereo view and virtual reality graphics applications. For example, some embodiments may provide increases frame rates for virtual reality and/or may enable the client class graphics hardware to run virtual reality titles.

System Overview

Figure 12:
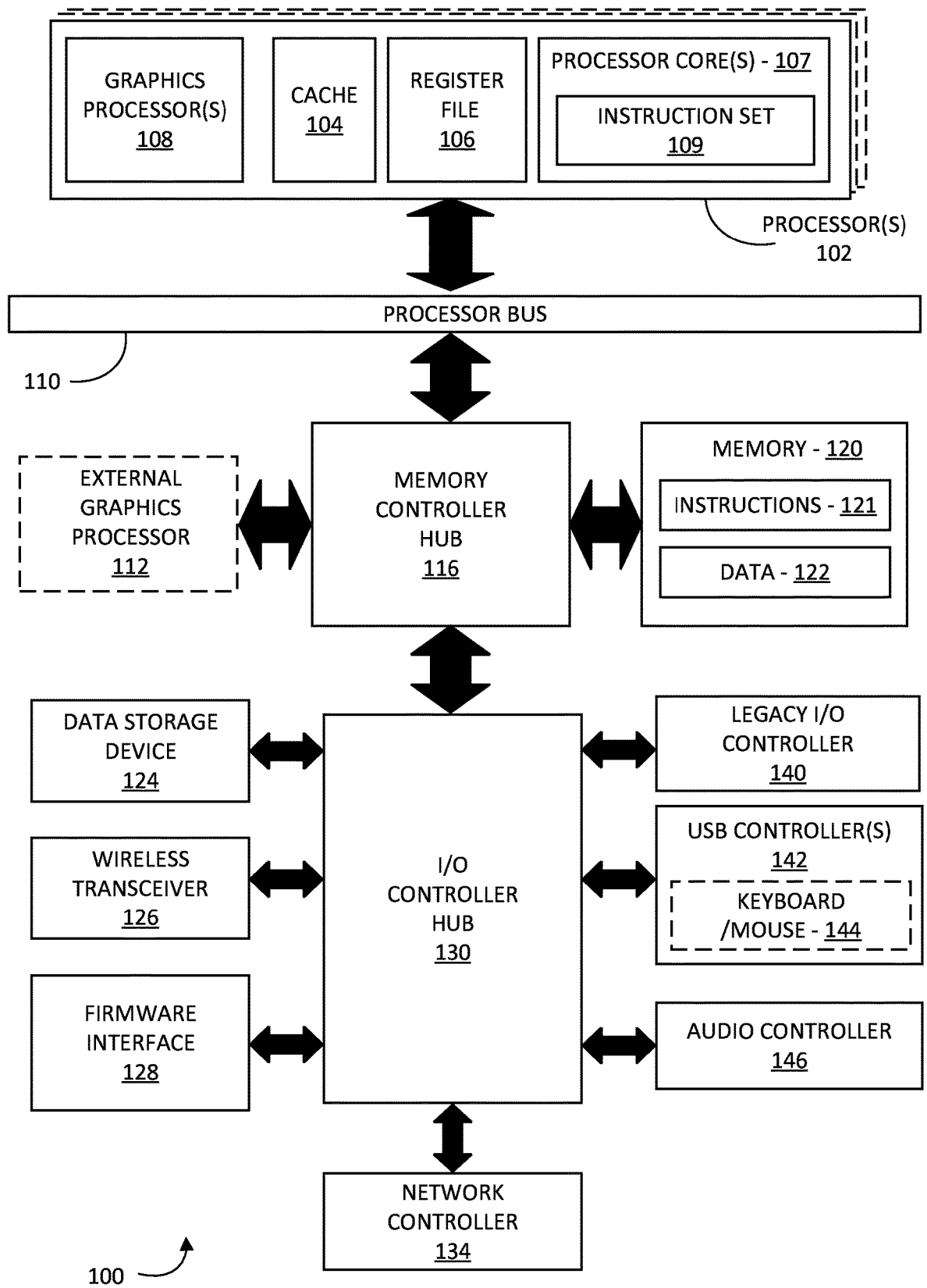
FIGS. 12-14 are block diagrams of an example of an overview of a data processing system according to an embodiment.

FIG. 12 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or LLC) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations. In some embodiments of the system 100, one or more of the graphics processor 108 and the external graphics processor 112 may advantageously include a primitive replicator in a raster stage as described herein.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 13:
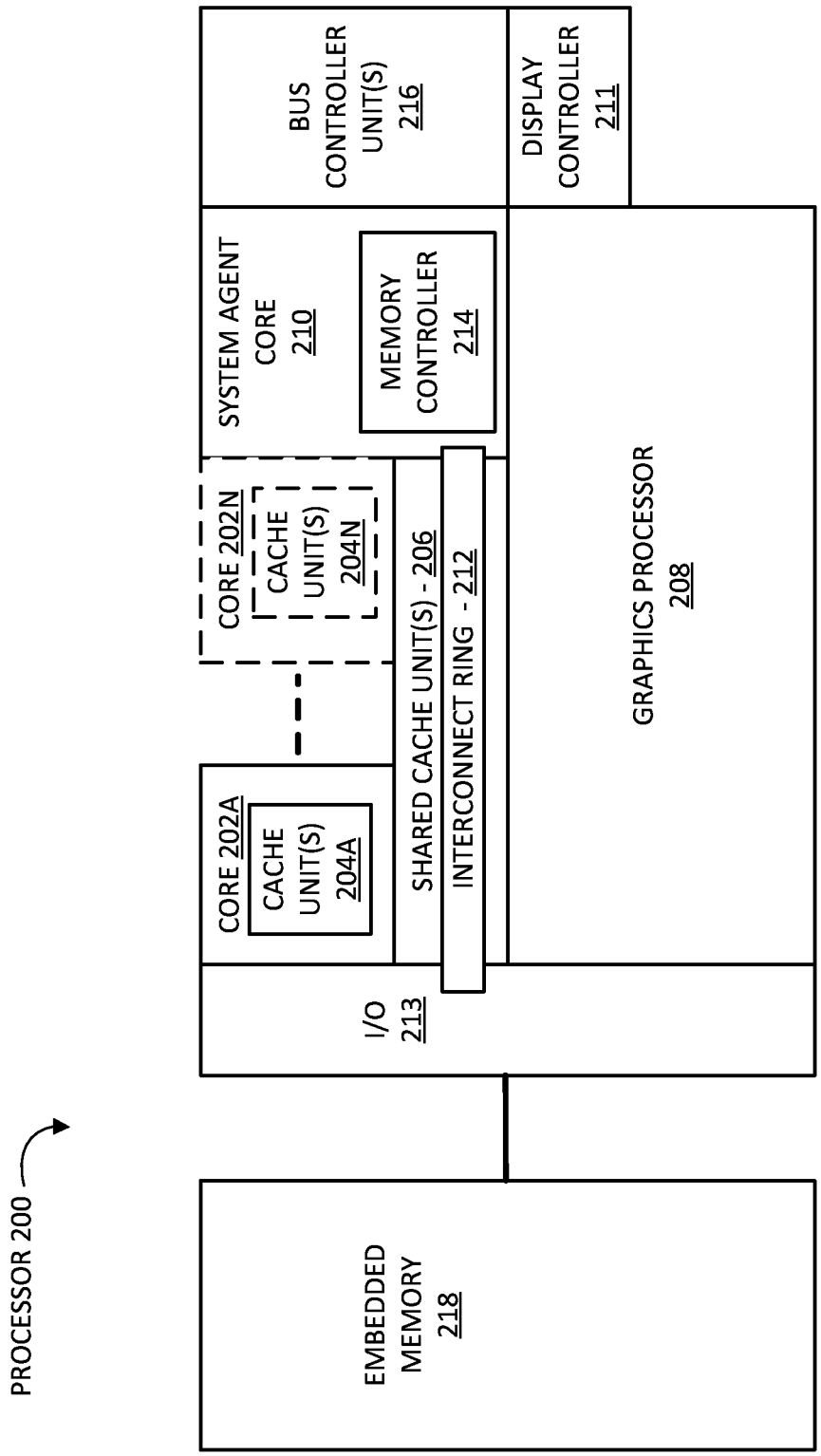

FIG. 13 is a block diagram of an embodiment of a processor 200 having one or more processor cores 202A-202N, an integrated memory controller 214, and an integrated graphics processor 208. Those elements of FIG. 13 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208. In some embodiments of the processor 200, the graphics processor 208 may advantageously include a primitive replicator in a raster stage as described herein.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 14:
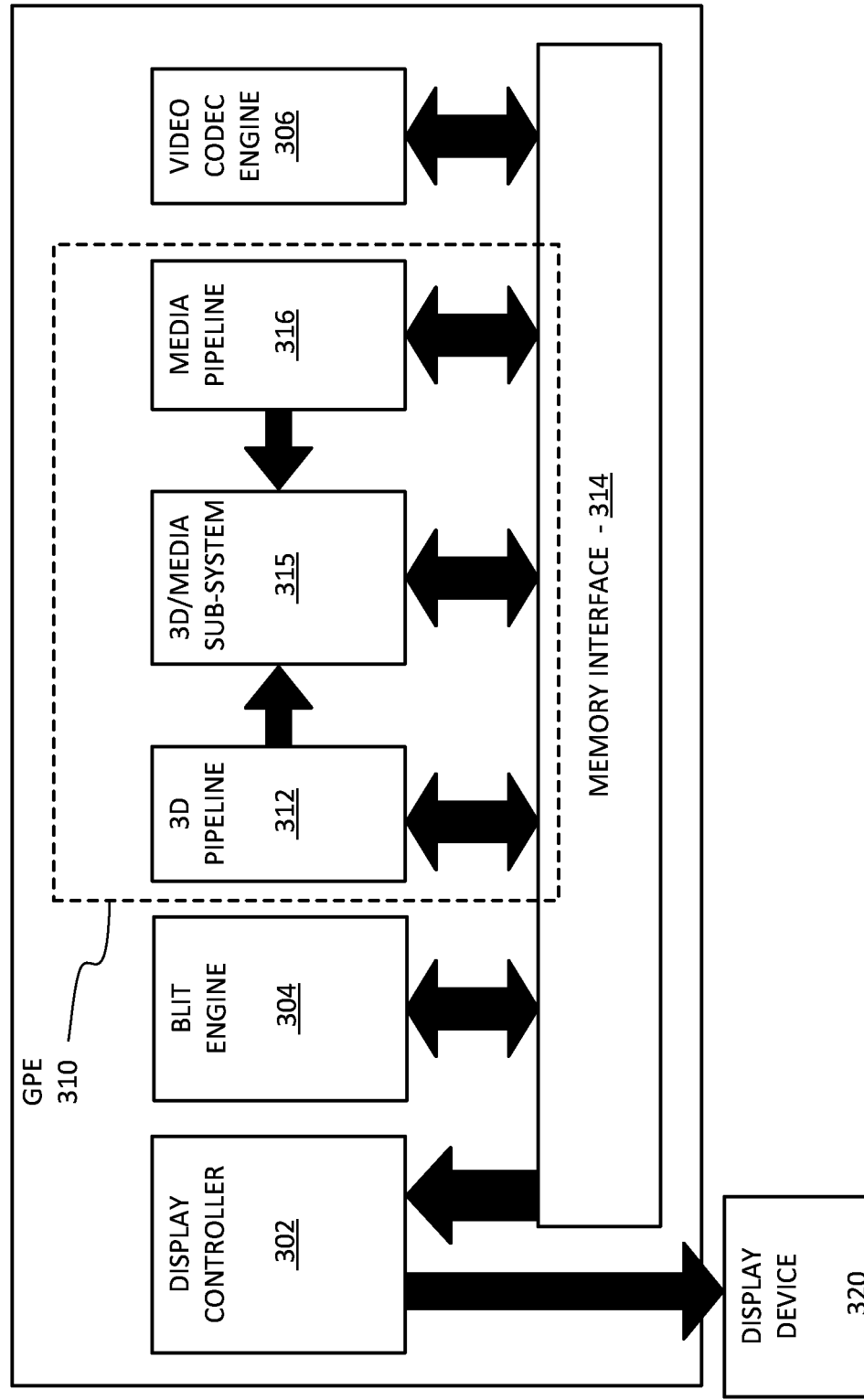

FIG. 14 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory. In some embodiments, the graphics processor 300 may advantageously include a primitive replicator in a raster stage as described herein.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics—processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 15:
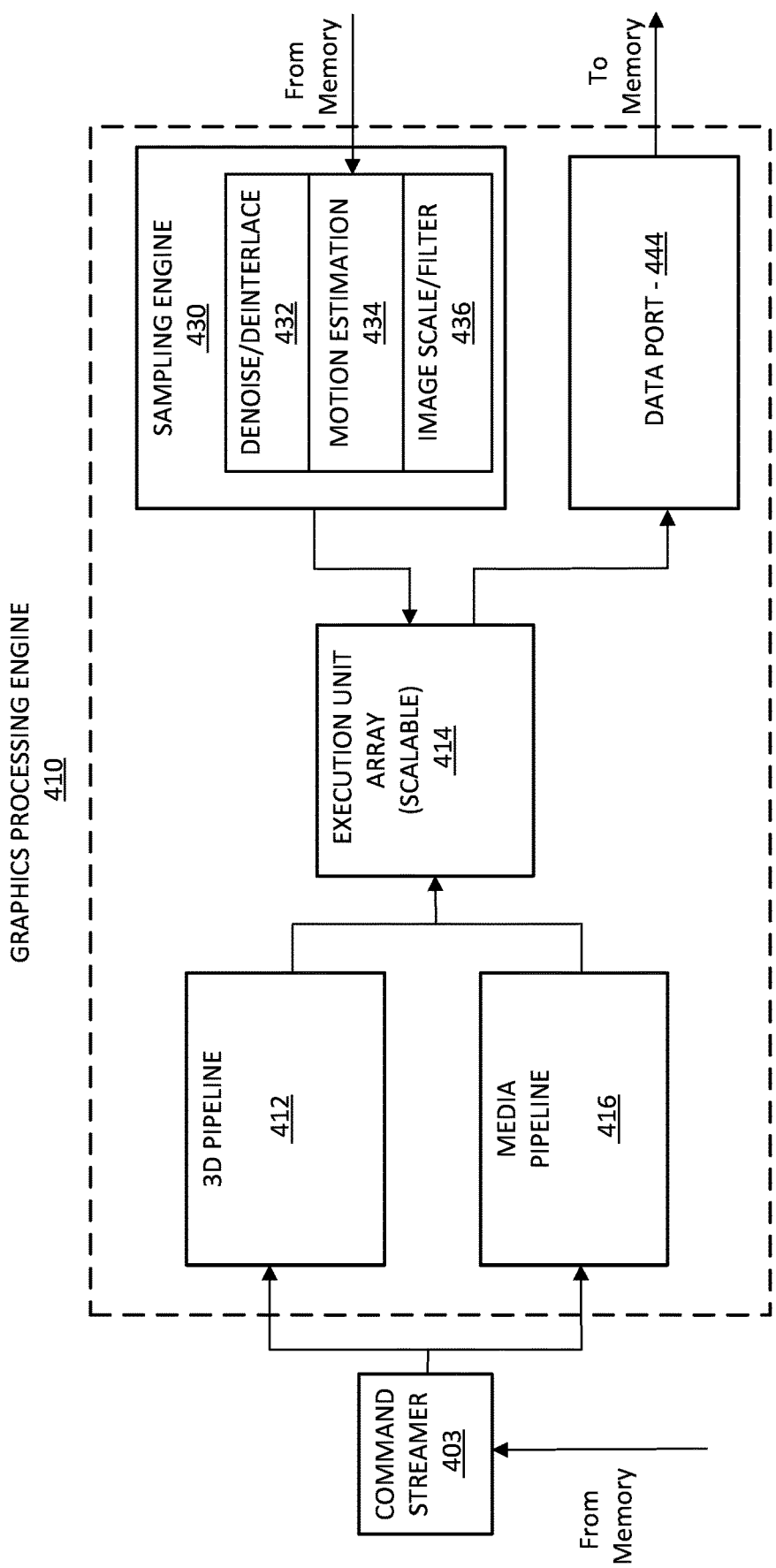
FIG. 15 is a block diagram of an example of a graphics processing engine according to an embodiment.

FIG. 15 is a block diagram of a graphics processing engine 410 of a graphics processor in accordance with some embodiments. In one embodiment, the GPE 410 is a version of the GPE 310 shown in FIG. 14. Elements of FIG. 15 having the same reference numbers (or names) as the elements of any other figure herein can operate or function in any manner similar to that described elsewhere herein, but are not limited to such. In some embodiments, the graphics processing engine 410 may advantageously include a primitive replicator in a raster stage as described herein.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 16:
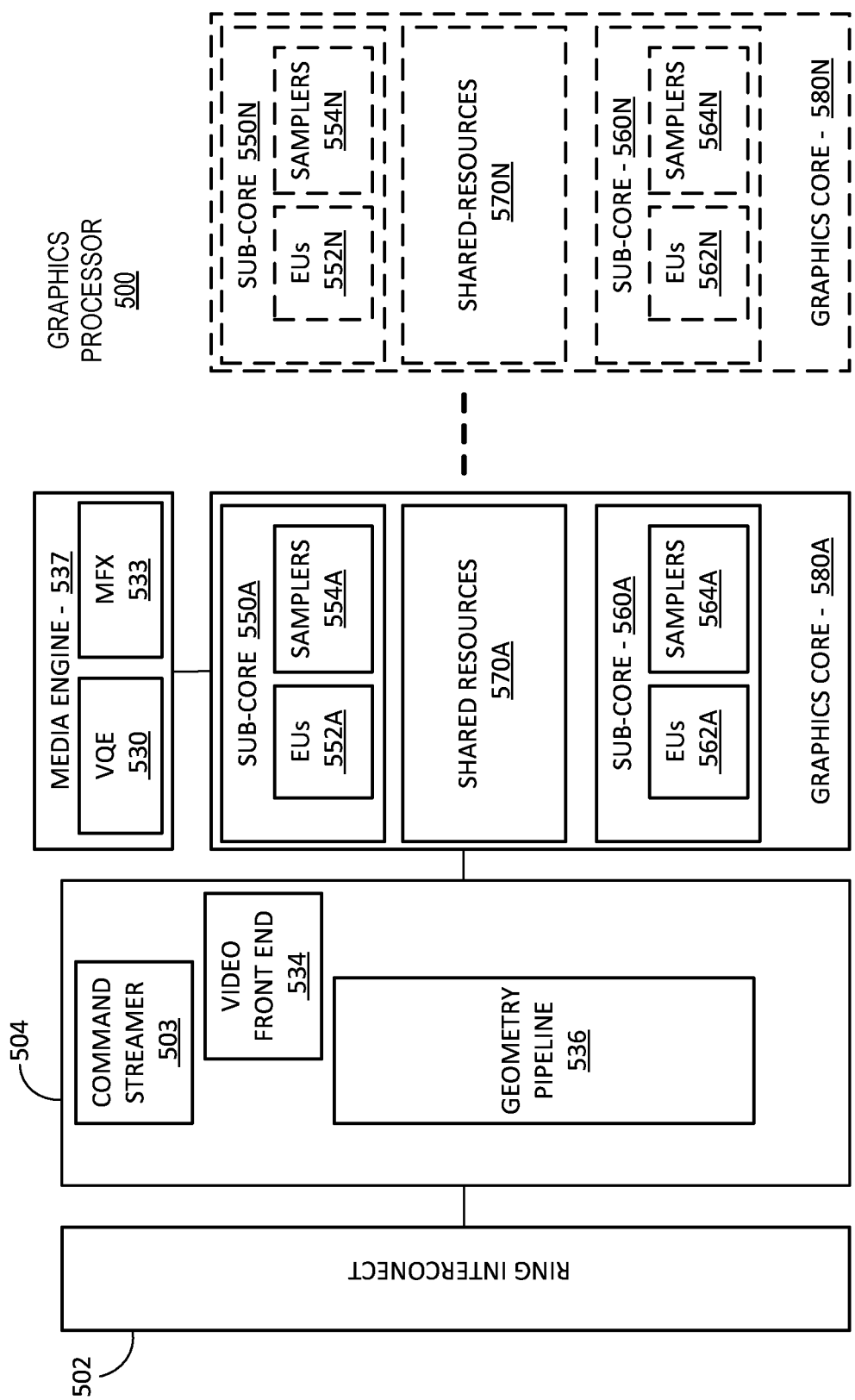
FIGS. 16-18 are block diagrams of examples of execution units according to an embodiment.

FIG. 16 is a block diagram of another embodiment of a graphics processor 500. Elements of FIG. 16 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system. In some embodiments, the graphics processor 500 may advantageously include a primitive replicator in a raster stage as described herein.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 17:
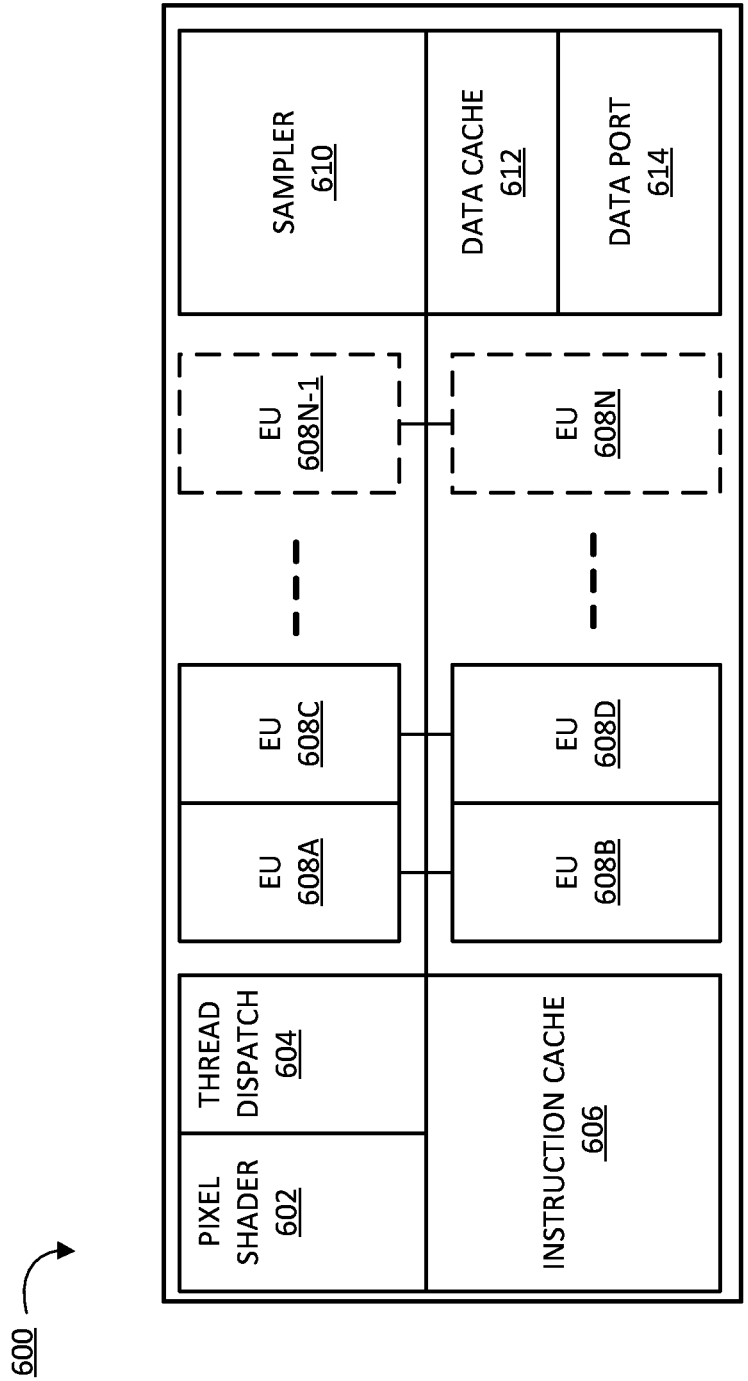

FIG. 17 illustrates thread execution logic 600 including an array of processing elements employed in some embodiments of a GPE. Elements of FIG. 17 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 16) dispatches vertex processing, tessellation, or geometry processing threads to thread execution logic 600 (FIG. 17). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 18:
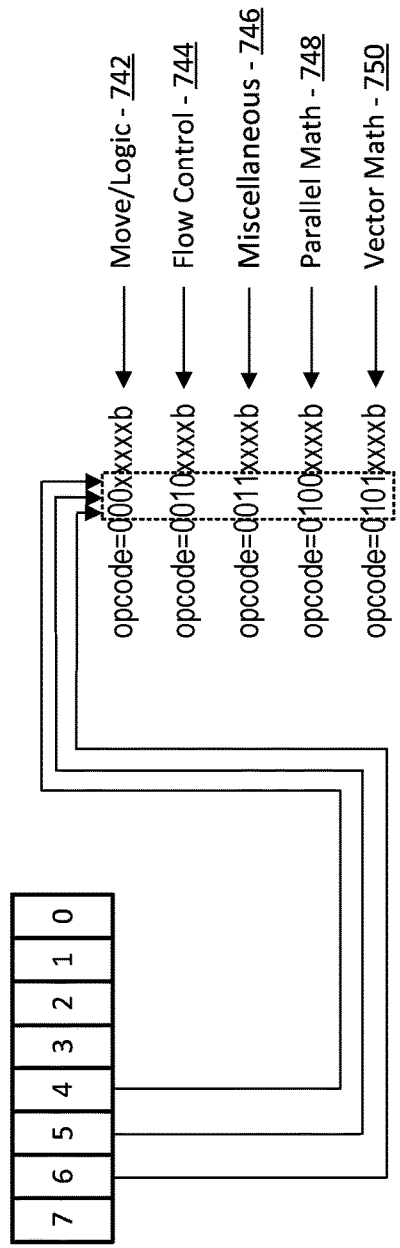

FIG. 18 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 19:
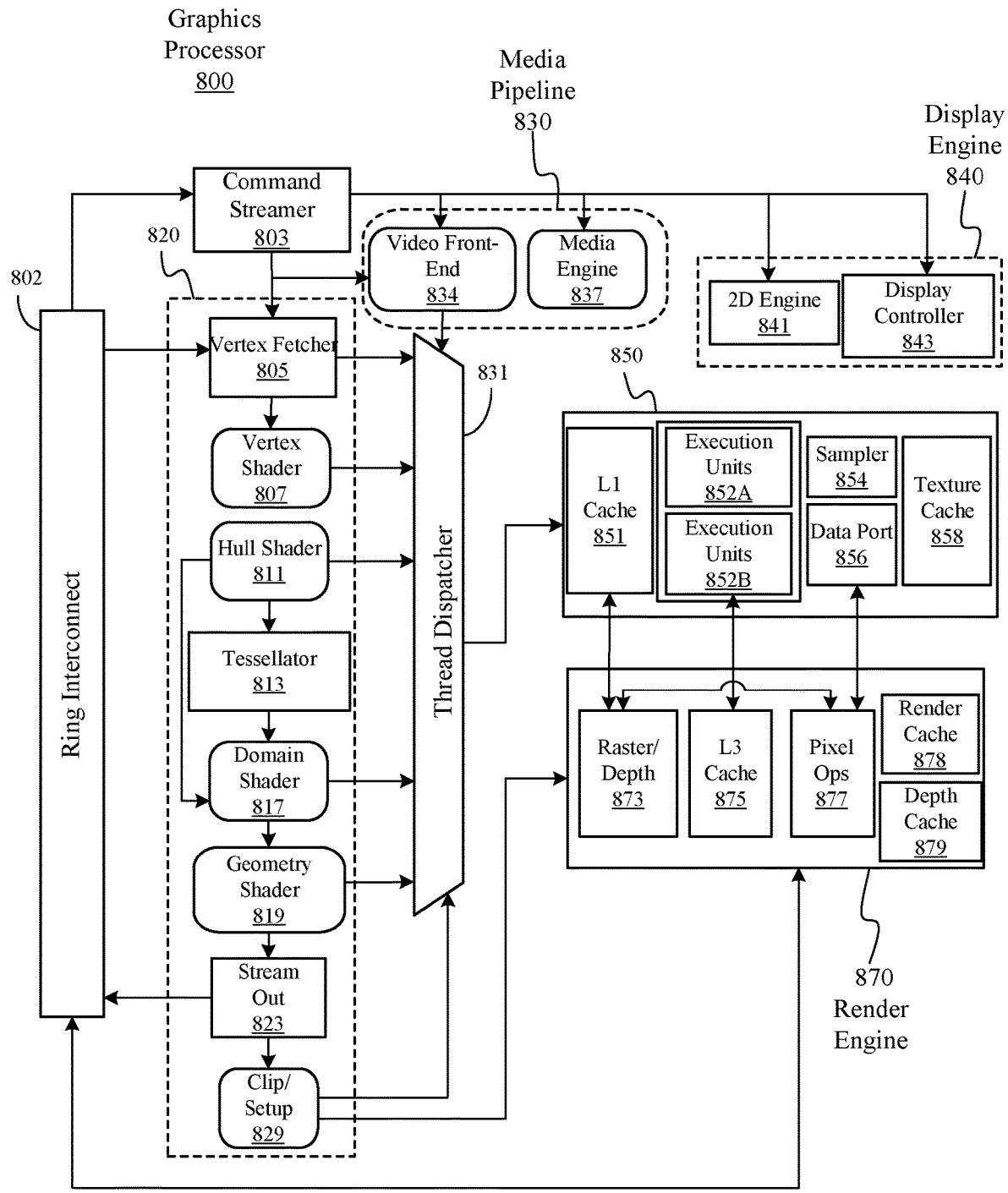
FIG. 19 is a block diagram of an example of a graphics pipeline according to an embodiment.

FIG. 19 is a block diagram of another embodiment of a graphics processor 800. Elements of FIG. 19 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830. In some embodiments, the graphics processor 800 may advantageously include a primitive replicator in a raster stage as described herein (e.g. in the graphics pipeline 820).

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 20A:
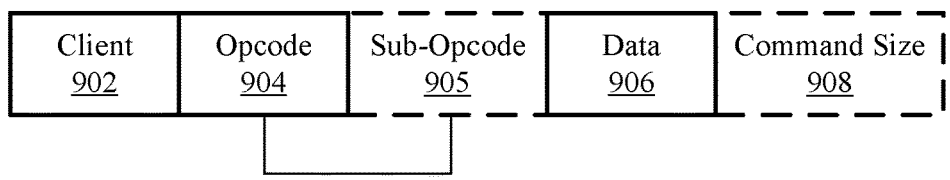
FIGS. 20A-20B are block diagrams of examples of graphics pipeline programming according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 20A illustrate the components that are generally included in a graphics command while the dashed lines include components that are optional or that are only included in a sub-set of the graphics commands. The exemplary graphics processor command format 900 of FIG. 20A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

Figure 20B:
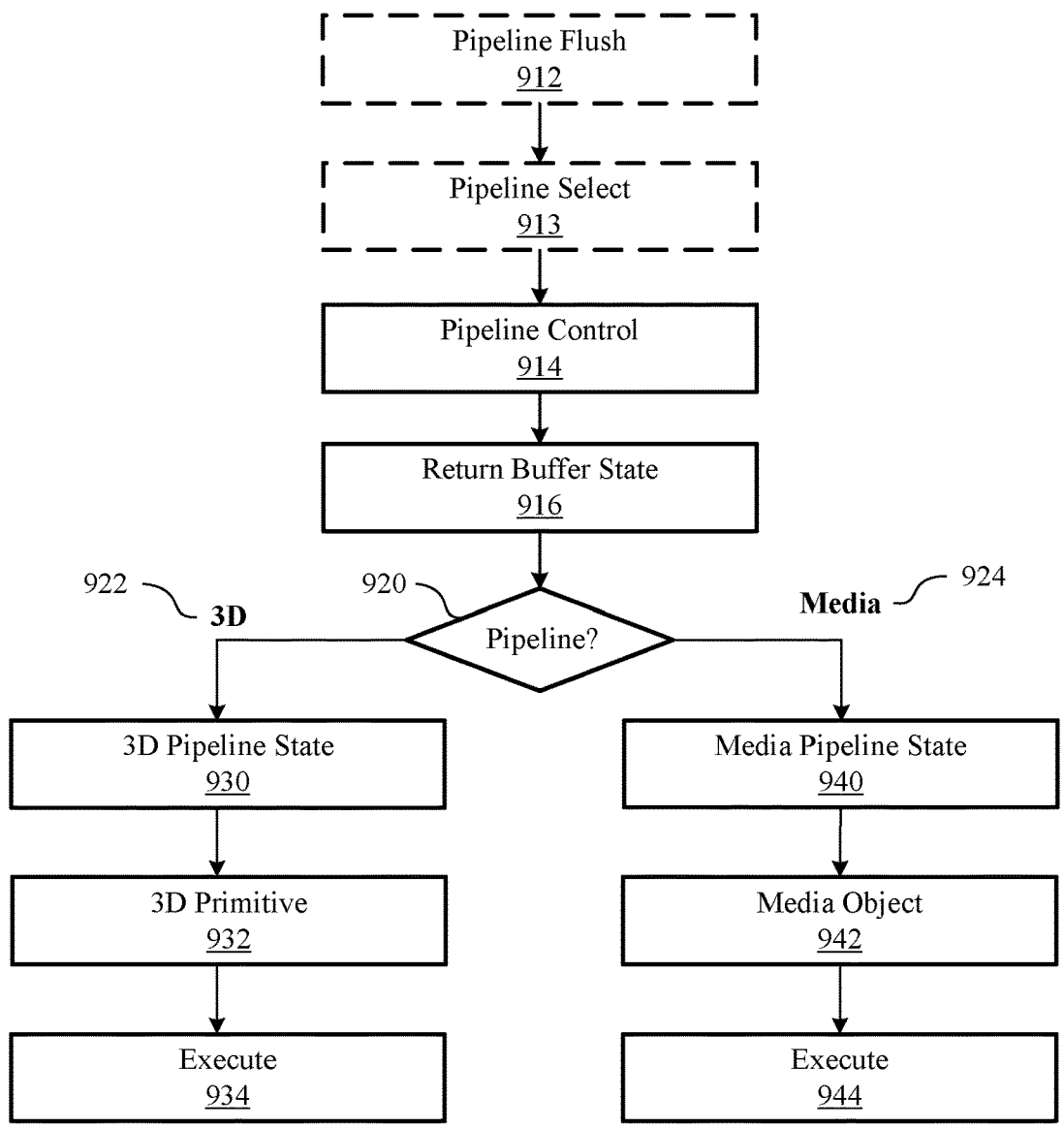

The flow diagram in FIG. 20B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 21:
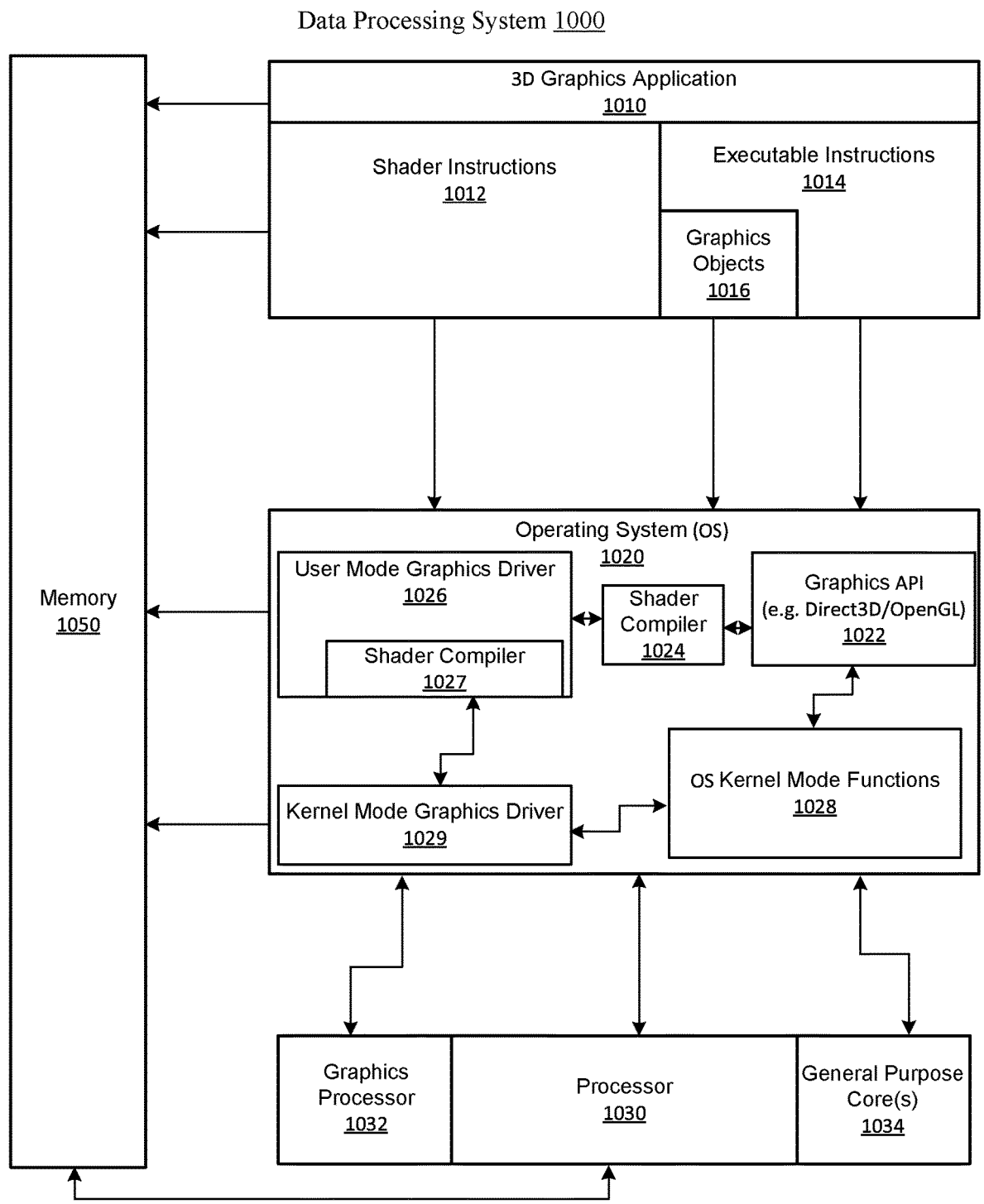
FIG. 21 is a block diagram of an example of a graphics software architecture according to an embodiment.

FIG. 21 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system. In some embodiments of the system 1000, the graphics processor 1032 may advantageously include a primitive replicator in a raster stage as described herein.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 22:
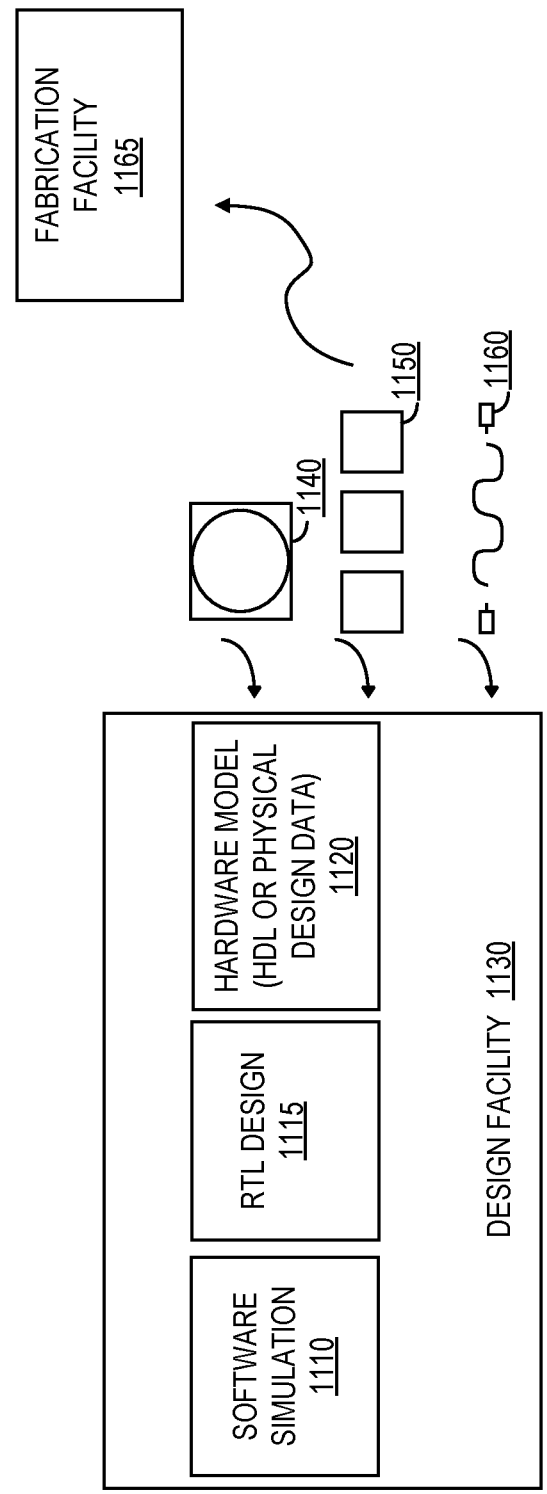
FIG. 22 is a block diagram of an example of an intellectual property (IP) core development system according to an embodiment.

FIG. 22 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 23:
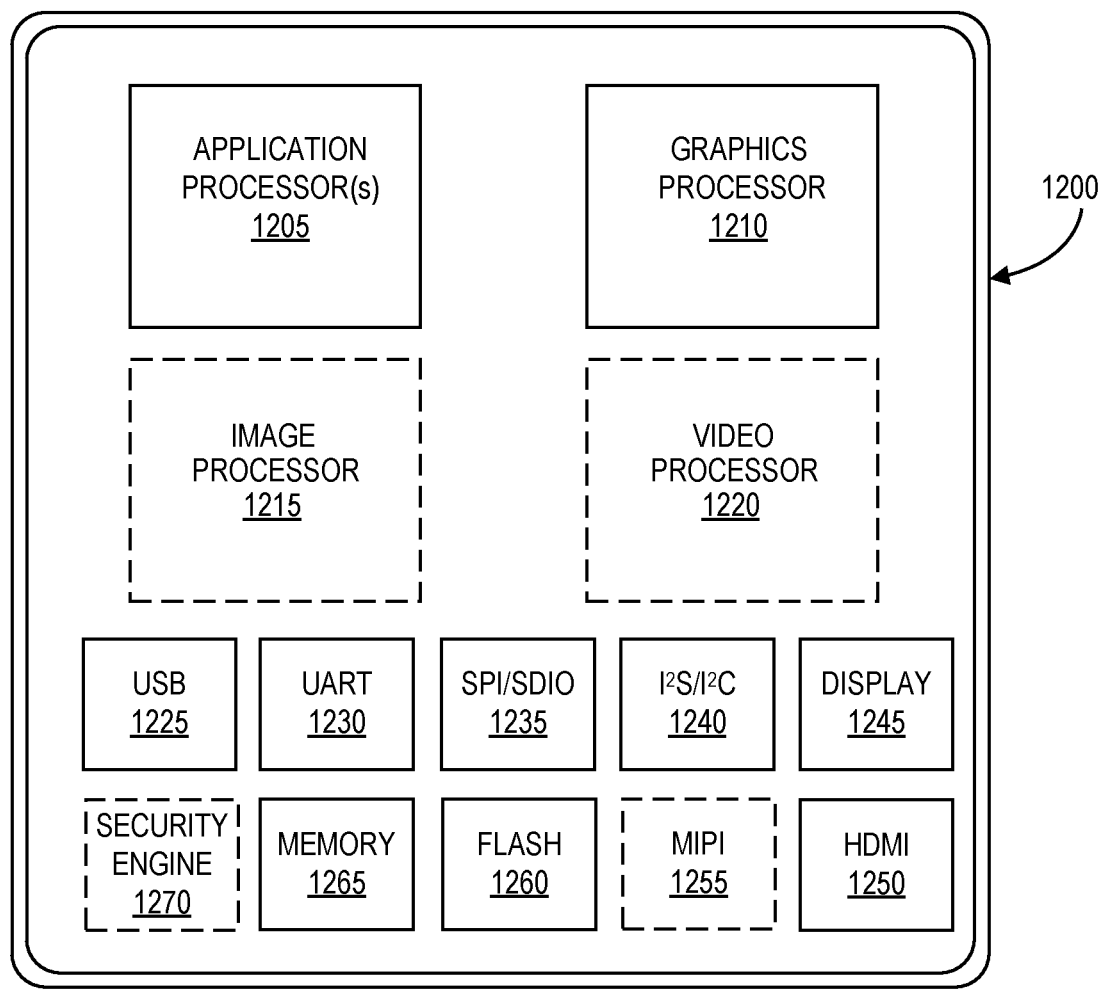
FIG. 23 is a block diagram of an example of a system on a chip integrated circuit according to an embodiment.

FIG. 23 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, universal asynchronous receiver/transmitter (UART) controller 1230, a serial peripheral interface (SPI)/secure digital input output (SDIO) controller 1235, and an integrated interchip sound (I2S)/inter-integrated circuit (I2C) controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270. In some embodiments of the system on a chip integrated circuit 1200, the at least one graphics processor 1210 may advantageously include a primitive replicator in a raster stage as described herein.

Additionally, other logic and circuits may be included in the processor of integrated circuit 1200, including additional graphics processors/cores, peripheral interface controllers, or general purpose processor cores.

Additional Notes and Examples

Example 1 may include a graphics processor system, comprising a cull geometry pipeline to cull geometries, the cull geometry pipeline including a first vertex fetcher to fetch vertices, a first vertex shader communicatively coupled to the first vertex fetcher to shade the fetched vertices, a first primitive assembler communicatively coupled to the first vertex shader to assemble primitives, and a first primitive replicator communicatively coupled to the first primitive assembler to replicate primitives for at least a first and a second viewport a replay geometry pipeline communicatively coupled to the cull geometry pipeline, the replay geometry pipeline including a second vertex fetcher to fetch vertices, a second vertex shader communicatively coupled to the second vertex fetcher to shade the fetched vertices, a second primitive assembler communicatively coupled to the second vertex shader to assemble primitives, and a second primitive replicator communicatively coupled to the second primitive assembler to replicate primitives for at least the first and the second viewport, and a visibility store communicatively coupled between the cull geometry pipeline and the replay geometry pipeline to store visibility information related to the assembled primitives and the replicated primitives.

Example 2 may include the graphics processor system of Example 1, wherein the first and second primitive replicators are each further to adjust respective position attributes of the replicated primitives for the second viewport relative to the first viewport.

Example 3 may include the graphics processor system of any of Examples 1 or 2, wherein the cull geometry pipeline further comprises a primitive culler communicatively coupled to the first primitive replicator to cull primitives based on a visibility test.

Example 4 may include the graphics processor system of Example 3, wherein the primitive culler is further to identify an original primitive as visible if any replicated primitive corresponding to the original primitive is identified as visible.

Example 5 may include a graphics processor pipeline apparatus, comprising a vertex fetcher to fetch vertices a vertex shader communicatively coupled to the vertex fetcher to shade the fetched vertices a primitive assembler communicatively coupled to the vertex shader to assemble primitives, and a primitive replicator communicatively coupled to the primitive assembler to replicate primitives for at least a first and a second viewport.

Example 6 may include the graphics processor pipeline apparatus of Example 5, wherein the primitive replicator is further to adjust respective position attributes of the replicated primitives for the second viewport relative to the first viewport.

Example 7 may include the graphics processor pipeline apparatus of any of Examples 5 or 6, further comprising a primitive culler communicatively coupled to the primitive replicator to cull primitives based on a visibility test.

Example 8 may include the graphics processor pipeline apparatus of Example 7, wherein the primitive culler is further to identify an original primitive as visible if any replicated primitive corresponding to the original primitive is identified as visible.

Example 9 may include the graphics processor pipeline apparatus of any of Examples 5 through 8, wherein the first viewport corresponds to a left eye viewport of a stereo virtual reality system and wherein the second viewport corresponds to a right eye viewport of the stereo virtual reality system.

Example 10 may include the graphics processor pipeline apparatus of any of Examples 5 through 8, wherein the first viewport is part of a first set of viewports which correspond to a first face of a cube rendering system and wherein the second viewport is part of a second set of viewports which corresponds to a second face of the cube rendering system.

Example 11 may include the graphics processor pipeline apparatus of any of Examples 5 through 8, wherein the first viewport corresponds to a first cascade of a cascaded shadow map and wherein the second viewport corresponds to a second cascade of the cascaded shadow map.

Example 12 may include a method of processing graphics, comprising fetching vertices shading the fetched vertices assembling primitives based on the shaded vertices, and replicating primitives for at least a first and a second viewport.

Example 13 may include the method of processing graphics of Example 12, further comprising adjusting respective position attributes of the replicated primitives for the second viewport relative to the first viewport.

Example 14 may include the method of processing graphics of any of Examples 12 or 13, further comprising culling primitives based on a visibility test.

Example 15 may include the method of processing graphics of Example 14, further comprising identifying an original primitive as visible if any replicated primitive corresponding to the original primitive is identified as visible.

Example 16 may include the method of processing graphics of any of Examples 12 through 15, wherein the first viewport corresponds to a left eye viewport of a stereo virtual reality system and wherein the second viewport corresponds to a right eye viewport of the stereo virtual reality system.

Example 17 may include the method of processing graphics of any of Examples 12 through 15, wherein the first viewport is part of a first set of viewports which correspond to a first face of a cube rendering system and wherein the second viewport is part of a second set of viewports which corresponds to a second face of the cube rendering system.

Example 18 may include the method of processing graphics of any of Examples 12 through 15, wherein the first viewport corresponds to a first cascade of a cascaded shadow map and wherein the second viewport corresponds to a second cascade of the cascaded shadow map.

Example 19 may include at least one computer readable storage media comprising a set of instructions, which when executed by a computing device, cause the computing device to fetch vertices shade the fetched vertices assemble primitives based on the shaded vertices, and replicate primitives for at least a first and a second viewport.

Example 20 may include the at least one computer readable storage media of Example 19, comprising a further set of instructions, which when executed by a computing device, cause the computing device to adjust respective position attributes of the replicated primitives for the second viewport relative to the first viewport.

Example 21 may include the at least one computer readable storage media of any of Examples 19 or 20, comprising a further set of instructions, which when executed by a computing device, cause the computing device to cull primitives based on a visibility test.

Example 22 may include the at least one computer readable storage media of Example 21, comprising a further set of instructions, which when executed by a computing device, cause the computing device to identify an original primitive as visible if any replicated primitive corresponding to the original primitive is identified as visible.

Example 23 may include the at least one computer readable storage media of any of Examples 19 through 22, wherein the first viewport corresponds to a left eye viewport of a stereo virtual reality system and wherein the second viewport corresponds to a right eye viewport of the stereo virtual reality system.

Example 24 may include the at least one computer readable storage media of any of Examples 19 through 22, wherein the first viewport is part of a first set of viewports which correspond to a first face of a cube rendering system and wherein the second viewport is part of a second set of viewports which corresponds to a second face of the cube rendering system.

Example 25 may include the at least one computer readable storage media of any of Examples 19 through 22, wherein the first viewport corresponds to a first cascade of a cascaded shadow map and wherein the second viewport corresponds to a second cascade of the cascaded shadow map.

Example 26 may include a graphics processor apparatus, comprising means for fetching vertices means for shading the fetched vertices means for assembling primitives based on the shaded vertices, and means for replicating primitives for at least a first and a second viewport.

Example 27 may include the graphics processor apparatus of Example 26, further comprising means for adjusting respective position attributes of the replicated primitives for the second viewport relative to the first viewport.

Example 28 may include the graphics processor apparatus of any of Examples 26 or 27, further comprising means for culling primitives based on a visibility test.

Example 29 may include the graphics processor apparatus of Example 28, further comprising means for identifying an original primitive as visible if any replicated primitive corresponding to the original primitive is identified as visible.

Example 30 may include the graphics processor apparatus of any of Examples 26 through 29, wherein the first viewport corresponds to a left eye viewport of a stereo virtual reality system and wherein the second viewport corresponds to a right eye viewport of the stereo virtual reality system.

Example 31 may include the graphics processor apparatus of any of Examples 26 through 29, wherein the first viewport is part of a first set of viewports which correspond to a first face of a cube rendering system and wherein the second viewport is part of a second set of viewports which corresponds to a second face of the cube rendering system.

Example 32 may include the graphics processor apparatus of any of Examples 26 through 29, wherein the first viewport corresponds to a first cascade of a cascaded shadow map and wherein the second viewport corresponds to a second cascade of the cascaded shadow map.

Example 33 may include a graphics processor apparatus, comprising a geometry stage to process geometries, and a raster stage communicatively coupled to the geometry stage, raster stage including a primitive assembler to assemble primitives, and a primitive replicator communicatively coupled to the primitive assembler to replicate primitives for at least a first and a second viewport.

Example 34 may include the graphics processor apparatus of Example 33, wherein the primitive replicator is further to adjust respective position attributes of the replicated primitives for the second viewport relative to the first viewport.

Example 35 may include the graphics processor apparatus of any of Examples 33 or 34, wherein the raster stage further comprises a primitive culler communicatively coupled to the primitive replicator to cull primitives based on a visibility test.

Example 36 may include the graphics processor apparatus of Example 35, wherein the primitive culler is further to identify an original primitive as visible if any replicated primitive corresponding to the original primitive is identified as visible.

Example 37 may include the graphics processor apparatus of any of Examples 33 through 36, wherein the first viewport corresponds to a left eye viewport of a stereo virtual reality system and wherein the second viewport corresponds to a right eye viewport of the stereo virtual reality system.

Example 38 may include the graphics processor apparatus of any of Examples 33 through 36, wherein the first viewport is part of a first set of viewports which correspond to a first face of a cube rendering system and wherein the second viewport is part of a second set of viewports which corresponds to a second face of the cube rendering system.

Example 39 may include the graphics processor apparatus of any of Examples 33 through 36, wherein the first viewport corresponds to a first cascade of a cascaded shadow map and wherein the second viewport corresponds to a second cascade of the cascaded shadow map.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a graphics processor;
a central processing unit; and
a memory including a set of instructions, which when executed by one or more of the graphics processor or the central processing unit, cause the computing system to:
shade vertices;
assemble primitives based on the shaded vertices, wherein the assembled primitives are to include an original primitive;
identify whether the original primitive is to be culled based on whether the original primitive is visible in a frustum common to a plurality of viewports that are to be associated with different views, and through a bypass of replication of the original primitive;
store visibility information that is to indicate whether to cull the original primitive, wherein the visibility information is to indicate that the original primitive is to be culled when the original primitive is not visible in the frustum, and the visibility information is to indicate that the original primitive is to be visible when the original primitive is visible in the frustum; and
determine whether to execute a process associated with the original primitive based on the visibility information, wherein the process is to be associated with replication of the original primitive across at least two of the plurality of viewports when the visibility information indicates that the original primitive is to be visible.

2. The system of claim 1, wherein the process is to include execution of a shade operation to shade vertices and an assemble operation to assemble the original primitive based on the vertices shaded by the shade operation, and further wherein:
the plurality of viewports is to include a left eye viewport of a stereo virtual reality system and a right eye viewport of the stereo virtual reality system,
the plurality of viewports is to include a first viewport that is to correspond to a first face of a cube rendering system, and a second viewport that is to correspond to a second face of the cube rendering system, or
the plurality of viewports is to include a first viewport that is to correspond to a first cascade of a cascaded shadow map and a second viewport that is to correspond to a second cascade of the cascaded shadow map.

3. The system of claim 1, wherein the set of instructions, which when executed by one or more of the graphics processor or the central processing unit, cause the computing system to:
execute the process when the visibility information indicates that the original primitive is visible to bypass a cull operation of the original primitive.

4. The system of claim 3, wherein the set of instructions, which when executed by one or more of the graphics processor or the central processing unit, cause the computing system to:
avoid execution of the process when the visibility information indicates that the original primitive is to be culled.

5. The system of claim 1, wherein the set of instructions, which when executed by one or more of the graphics processor or the central processing unit, cause the computing system to:
determine the visibility information based only on the original primitive from the assembled primitives.

6. The system of claim 1, wherein the set of instructions, which when executed by one or more of the graphics processor or the central processing unit, cause the computing system to:
fetch only position attributes from a plurality of attributes; and
shade the vertices based on only the position attributes from the plurality of attributes.

7. An apparatus comprising:
a memory; and
logic communicatively coupled to the memory, wherein the logic is implemented at least partly in one or more of configurable logic or fixed-functionality logic hardware, the logic communicatively coupled to the memory to:
shade vertices;
assemble primitives based on the shaded vertices, wherein the assembled primitives are to include an original primitive;
identify whether the original primitive is to be culled based on whether the original primitive is visible in a frustum common to a plurality of viewports that are to be associated with different views, and through a bypass of replication of the original primitive;
store visibility information that is to indicate whether to cull the original primitive, wherein the visibility information is to indicate that the original primitive is to be culled when the original primitive is not visible in the frustum, and the visibility information is to indicate that the original primitive is to be visible when the original primitive is visible in the frustum; and
determine whether to execute a process associated with the original primitive based on the visibility information, wherein the process is to be associated with replication of the original primitive across at least two of the plurality of viewports when the visibility information indicates that the original primitive is to be visible.

8. The apparatus of claim 7, wherein the process is to include execution of a shade operation to shade vertices and an assemble operation to assemble the original primitive based on the vertices shaded by the shade operation, and further wherein:
the plurality of viewports is to include a left eye viewport of a stereo virtual reality system and a right eye viewport of the stereo virtual reality system,
the plurality of viewports is to include a first viewport that is to correspond to a first face of a cube rendering system, and a second viewport that is to correspond to a second face of the cube rendering system, or
the plurality of viewports is to include a first viewport that is to correspond to a first cascade of a cascaded shadow map and a second viewport that is to correspond to a second cascade of the cascaded shadow map.

9. The apparatus of claim 7, wherein the logic communicatively coupled to the memory is to:
execute the process when the visibility information indicates that the original primitive is visible to bypass a cull operation of the original primitive.

10. The apparatus of claim 9, wherein the logic communicatively coupled to the memory is to:
avoid execution of the process when the visibility information indicates that the original primitive is to be culled.

11. The apparatus of claim 7, wherein the logic communicatively coupled to the memory is to:
determine the visibility information based only on the original primitive from the assembled primitives.

12. The apparatus of claim 7, wherein the logic communicatively coupled to the memory is to:
fetch only position attributes from a plurality of attributes; and
shade the vertices based on only the position attributes from the plurality of attributes.

13. A method comprising:
shading vertices;
assembling primitives based on the shaded vertices, wherein the assembled primitives include an original primitive;
identifying whether the original primitive will be culled based on whether the original primitive is visible in a frustum common to a plurality of viewports that are associated with different views and through a bypass of replication of the original primitive;
storing visibility information that indicates whether to cull the original primitive, wherein the visibility information indicates that the original primitive will be culled when the original primitive is not visible in the frustum, and the visibility information indicates that the original primitive will be visible when the original primitive is visible in the frustum; and
determining whether to execute a process associated with the original primitive based on the visibility information, wherein the process is associated with replication of the original primitive across at least two of the plurality of viewports when the visibility information indicates that the original primitive is visible.

14. The method of claim 13, wherein the process includes executing a shade operation to shade vertices and an assemble operation to assemble the original primitive based on the vertices shaded by the shade operation, further wherein:
the plurality of viewports includes a left eye viewport of a stereo virtual reality system and a right eye viewport of the stereo virtual reality system,
the plurality of viewports includes a first viewport that corresponds to a first face of a cube rendering system, and a second viewport that corresponds to a second face of the cube rendering system, or
the plurality of viewports is to include a first viewport that corresponds to a first cascade of a cascaded shadow map and a second viewport that corresponds to a second cascade of the cascaded shadow map.

15. The method of claim 13, wherein the method further comprises:
executing the process when the visibility information indicates that the original primitive is visible to bypass a cull operation of the original primitive.

16. The method of claim 15, wherein the method further comprises:
avoiding execution of the process when the visibility information indicates that the original primitive will be culled.

17. The method of claim 13, wherein the method further comprises:
determining the visibility information based only on the original primitive from the assembled primitives.

18. The method of claim 13, wherein the method further comprises:
fetching only position attributes from a plurality of attributes; and
shading the vertices based on only the position attributes from the plurality of attributes.

19. At least one non-transitory computer readable storage media comprising a set of instructions, which when executed by a computing device, cause the computing device to:
shade vertices;
assemble primitives based on the shaded vertices, wherein the assembled primitives are to include an original primitive;
identify whether the original primitive is to be culled based on whether the original primitive is visible in a frustum common to a plurality of viewports that are to be associated with different views, and through a bypass of replication of the original primitive;
store visibility information that is to indicate whether to cull the original primitive, wherein the visibility information is to indicate that the original primitive is to be culled when the original primitive is not visible in the frustum, and the visibility information is to indicate that the original primitive is to be visible when the original primitive is visible in the frustum; and
determine whether to execute a process associated with the original primitive based on the visibility information, wherein the process is to be associated with replication of the original primitive across at least two of the plurality of viewports when the visibility information indicates that the original primitive is to be visible.

20. The at least one non-transitory computer readable storage media of claim 19, wherein the process is to include execution of a shade operation to shade vertices and an assemble operation to assemble the original primitive based on the vertices shaded by the shade operation, and
further wherein:
the plurality of viewports is to include a left eye viewport of a stereo virtual reality system and a right eye viewport of the stereo virtual reality system,
the plurality of viewports is to include a first viewport that is to correspond to a first face of a cube rendering system, and a second viewport that is to correspond to a second face of the cube rendering system, or
the plurality of viewports is to include a first viewport that is to correspond to a first cascade of a cascaded shadow map and a second viewport that is to correspond to a second cascade of the cascaded shadow map.

21. The at least one non-transitory computer readable storage media of claim 19, wherein the instructions, when executed, cause the computing device to:
execute the process when the visibility information indicates that the original primitive is visible to bypass a cull operation of the original primitive.

22. The at least one non-transitory computer readable storage media of claim 21, wherein the instructions, when executed, cause the computing device to:
avoid execution of the process when the visibility information indicates that the original primitive is to be culled.

23. The at least one non-transitory computer readable storage media of claim 19, wherein the instructions, when executed, cause the computing device to:
determine the visibility information based only on the original primitive from the assembled primitives.

24. The at least one non-transitory computer readable storage media of claim 19, wherein the instructions, when executed, cause the computing device to:
fetch only position attributes from a plurality of attributes; and
shade the vertices based on only the position attributes from the plurality of attributes.

* * * * *